US008447908B2

(12) United States Patent
Bruce et al.

(10) Patent No.: US 8,447,908 B2
(45) Date of Patent: May 21, 2013

(54) MULTILEVEL MEMORY BUS SYSTEM FOR SOLID-STATE MASS STORAGE

(75) Inventors: Ricardo H. Bruce, Union City, CA (US); Elsbeth Lauren T. Villapana, Las Pinas (PH); Joel A. Baylon, Cavite (PH)

(73) Assignee: BiTMICRO Networks, Inc., Fremont, CA (US)

( * ) Notice: Subject to any disclaimer, the term of this patent is extended or adjusted under 35 U.S.C. 154(b) by 91 days.

(21) Appl. No.: 12/876,247

(22) Filed: Sep. 7, 2010

(65) Prior Publication Data
US 2011/0161568 A1 Jun. 30, 2011

Related U.S. Application Data

(60) Provisional application No. 61/240,246, filed on Sep. 7, 2009.

(51) Int. Cl.
*G06F 13/28* (2006.01)
*G06F 13/36* (2006.01)
*G06F 9/44* (2006.01)

(52) U.S. Cl.
USPC .............................. 710/308; 711/103; 710/22

(58) Field of Classification Search
USPC .......................................................... 710/22
See application file for complete search history.

(56) References Cited

U.S. PATENT DOCUMENTS

| 5,822,251 A * | 10/1998 | Bruce et al. ............... 365/185.33 |
| 2002/0141244 A1 * | 10/2002 | Bruce et al. ............... 365/185.33 |
| 2009/0094411 A1 * | 4/2009 | Que ............................. 711/103 |

* cited by examiner

*Primary Examiner* — Idriss N Alrobaye
*Assistant Examiner* — Brooke Taylor
(74) *Attorney, Agent, or Firm* — Stephen Uriarte

(57) ABSTRACT

The present invention relates to a multilevel memory bus system for transferring information between at least one DMA controller and at least one solid-state semiconductor memory device, such as NAND flash memory devices or the like. This multilevel memory bus system includes at least one DMA controller coupled to an intermediate bus; a flash memory bus; and a flash buffer circuit between the intermediate bus and the flash memory bus. This multilevel memory bus system may be disposed to support: an n-bit wide bus width, such as nibble-wide or byte-wide bus widths; a selectable data sampling rate, such as a single or double sampling rate, on the intermediate bus; a configurable bus data rate, such as a single, double, quad, or octal data sampling rate; CRC protection; an exclusive busy mechanism; dedicated busy lines; or any combination of these.

29 Claims, 14 Drawing Sheets

(Solid-State Storage Device with Two Multilevel Buses)

(Flash Buffer Circuit with Buffer)

(State Diagram)

(Timing Diagram: Transferring 8-bit Command Information Across a Nibble Wide n-bit Data Path of an Intermediate Bus)

(Timing Diagram: Transferring 8-Bit Data Information (Raw Data and CRC Data) Across a Nibble Wide n-bit Data Path of an Intermediate Bus)

(Timing Diagram: Single Data Sampling)

(Timing Diagram: Double Data Sampling)

(Timing Diagram: Different Data Path Clock Rates on Multilevel Memory Bus - Quad)

(Timing Diagram: Different Data Path Clock Rates on Multilevel Memory Bus - Octal)

(Dedicated Busy Signal Lines from Flash Memory Devices to Single Flash Buffer Circuit)

(Busy Signal Timing Diagram for Dedicated and Time Multiplexed Busy Signal Lines)

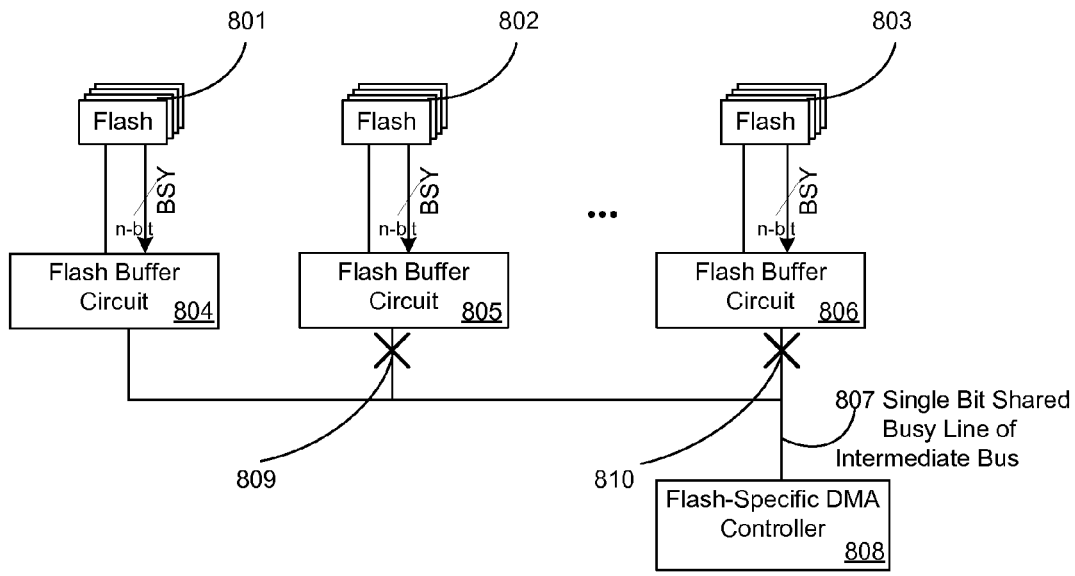

FIG. 8

(Exclusive Busy Mechanism for Selecting Single Flash Buffer Circuit from a Plurality of Flash Buffer Circuits that Share the Same Single Bit Shared Busy Line)

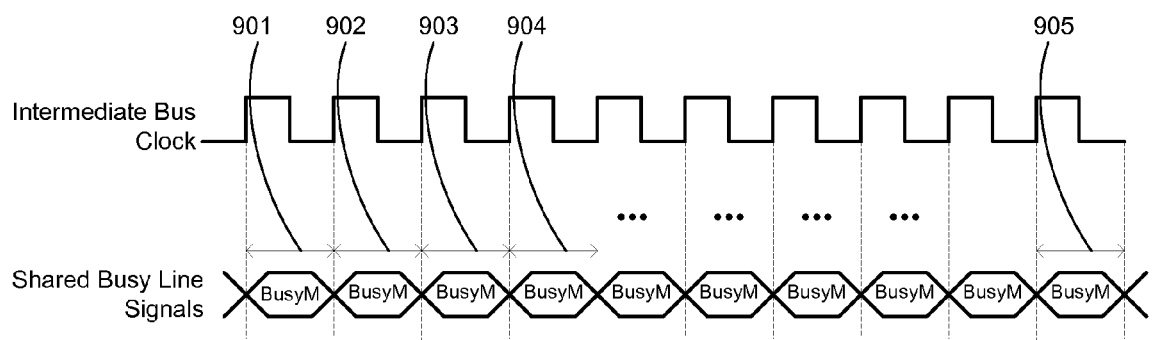

FIG. 9

(Exclusive Busy Signal Timing Diagram for Selecting a Single Flash Memory Device from a Plurality of Flash Memory Devices that Are Coupled to the Same Flash Buffer Circuit through Multiplexed Dedicated Busy Signal Lines)

(Timing Diagram: Initialization Transfer Mode)

(Timing Diagram: Normal Transfer Mode – Write)

(Timing Diagram: Normal Transfer Mode – Write (Cont'd))

(Timing Diagram: Normal Transfer Mode – Read)

(Timing Diagram: Normal Transfer Mode – Read (Cont'd))

MULTILEVEL MEMORY BUS SYSTEM FOR SOLID-STATE MASS STORAGE

CROSS-REFERENCE(S) TO RELATED APPLICATIONS

This application claims the benefit of United States Provisional application, entitled "Multilevel Memory Bus System for Solid-State Mass Storage", having filing date of 7 Sep. 2009 and Ser. No. 61/240,246, which is hereby incorporated by reference as if fully set forth herein.

BACKGROUND (1) Technical Field

The present invention relates to memory buses that can be used with computing devices that use solid-state mass storage, such as mass storage devices that use semiconductor memory devices as their respective mass storage memory store, named "solid-state mass storage devices", and with computing devices that employ a solid-state memory subsystem.

(2) Description of the Related Art

Unlike hard disk drives, solid-state storage devices are disposed with a solid-state memory subsystems comprising of a plurality of semiconductor memory devices that have addressable memory cells. Increasing the memory capacity of these memory subsystems is difficult to perform without also negatively impacting the memory performance of these memory subsystems, the integrity of data transferred through the memory bus of these mass storage devices, or both. In addition, semiconductor technology continues to improve, and thus change, rendering known memory bus designs not readily adaptable to such change. Consequently, there is a need for a memory bus solution that can be adapted for a selected memory capacity, semiconductor memory device technology advancements, or both. In addition, for a selected mass storage capacity configuration or semiconductor device technology level of a solid-state mass storage subsystem, there is a need to maintain the integrity of data transferred through the memory bus solution, maximize memory subsystem performance, or both.

SUMMARY

The present invention relates to a multilevel memory bus system for transferring information between at least one DMA controller and at least one solid-state semiconductor memory device, such as NAND flash memory devices or the like. This multilevel memory bus system includes at least one DMA controller coupled to an intermediate bus; a flash memory bus; and a flash buffer circuit between the intermediate bus and the flash memory bus. This multilevel memory bus system may be disposed to support: an n-bit wide bus width, such as nibble-wide or byte-wide bus widths; a selectable data sampling rate, such as a single or double sampling rate, on the intermediate bus; a configurable bus data rate, such as a single, double, quad, or octal data sampling rate; CRC protection; an exclusive busy mechanism; dedicated busy lines; or any combination of these.

In another embodiment of the present invention, the flash buffer circuit is disposed with an internal data buffer coupled between the intermediate bus and the flash memory bus. This internal data buffer may be used to support read/write burst functionality on the intermediate bus.

BRIEF DESCRIPTION OF THE DRAWINGS

FIG. 8 shows an exclusive busy mechanism for selecting a single flash buffer circuit from a plurality of flash buffer circuits that share the same busy line in accordance with yet another embodiment of the present invention.

FIG. 9 shows an exclusive busy mechanism for selecting a single flash memory device form a plurality of flash memory devices that are coupled to the same flash buffer circuit through multiplexed dedicated busy signal lines in accordance with yet another embodiment of the present invention;

DETAILED DESCRIPTION OF THE INVENTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming but would nevertheless be a routine engineering undertaking for those of ordinary skill in the art having the benefit of this disclosure.

The various embodiments disclosed herein are not intended to limit the scope and spirit of the herein disclosure. For example, the present invention may be used to enhance the basic architecture of existing storage solutions and devices that use semiconductor memory devices, such as flash memory, including the device disclosed in U.S. Pat. No. 5,822,251, entitled "Expandable Flash-Memory Mass-Storage Using Shared Buddy Lines and Intermediate Flash-Bus Between Device-Specific Buffers and Flash-Intelligent DMA controllers", issued on Oct. 13, 1998, hereinafter named the "patent", and which is hereby incorporated by reference as if fully set forth herein.

Figure 1:
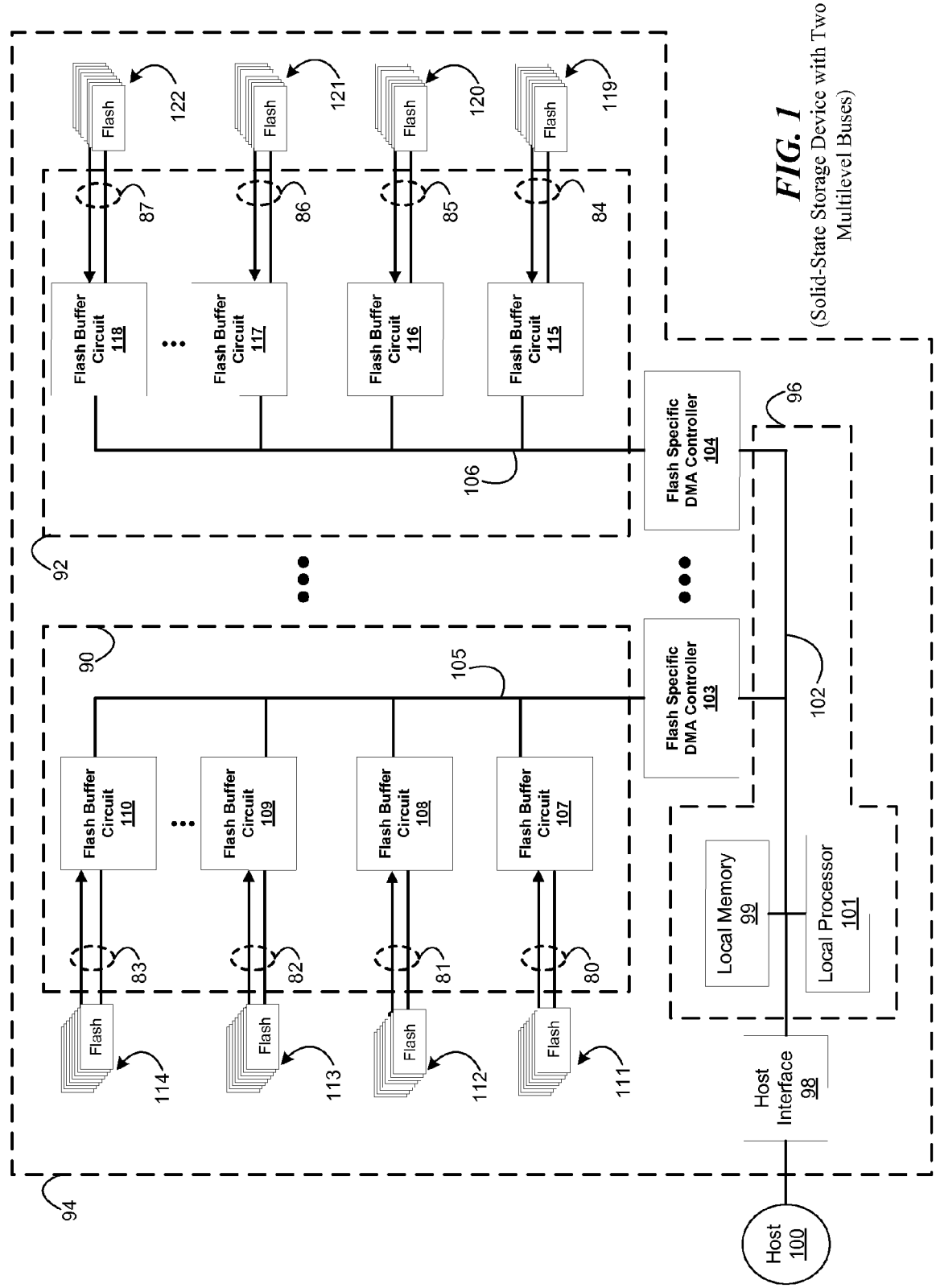
FIG. 1 is a block diagram of a solid-state storage device that employs two multilevel memory bus system in accordance with one embodiment of the present invention.

To increase performance, adapt to the effects, such as bus loading, caused by changes in solid-state memory capacity, adapt to changes in the technology level of semiconductor technology, maintain the integrity of data subject to a memory operation through a memory bus, or any combination of these, a solid-state storage device may be disposed with at least one multilevel memory bus system, such as multilevel memory bus system 90 and 92 in FIG. 1. Since in FIG. 1, flash memory devices are used as the storage media, memory operations may also be referred to herein as flash memory operation(s). A flash memory device permits memory operations, such as a write or read operation, to be performed on flash blocks according to a protocol supported by the flash memory device.

Memory devices in flash banks 111-114 and 119-122 in FIG. 1 may each be implemented using a NAND flash memory device that complies with the Open NAND Flash Interface Specification, commonly referred to as ONFI Specification. The term "ONFI Specification" is a known device interface standard created by a consortium of technology companies, called the "ONFI Workgroup". The ONFI Workgroup develops open standards for NAND flash memory devices and for devices that communicate with these NAND flash memory devices. The ONFI Workgroup is headquartered in Hillsboro, Oreg. Using a flash memory device that complies with the ONFI Specification is not intended to limit the embodiment disclosed. One of ordinary skill in the art having the benefit of this disclosure would readily recognize that other types of flash memory devices employing different device interface protocols may be used, such as protocols compatible with the standards created through the Non-Volatile Memory Host Controller Interface ("NVMHCI") working group. Members of the NVMHCI working group include Intel Corporation of Santa Clara, Calif., Dell Inc. of Round Rock, Tex. and Microsoft Corporation of Redmond, Wash.

Multilevel memory bus systems 90 and 92 are part of a solid-state storage device 94 that includes a local processing system 96, a host interface 98, a plurality of semiconductor memory devices, at least one flash-specific DMA controller, such as flash-specific DMA controllers 103 and 104. FIG. 1 also discloses a host 100, which is coupled to storage device 94 through host interface 98. Host interface 98 is disposed to receive memory transactions requests from host 100 and to return the results of these requests to host 100. Host 100 may be any computing device that can communicate with host interface 98, such as by sending these memory transaction requests and receiving the results of such requests, and may be in the form of a computer and its equivalents.

Local processing system 96 includes a processor, named local processor" 101, a local memory 99, which may be in the form of DRAM, and a local bus 102. Host interface 98, local memory 99, local processor 101, and flash-specific DMA controllers 103 and 104 are coupled together through local bus 102. The plurality of semiconductor memory devices may be in the form of NAND flash memory devices, which may be arranged into banks of NAND flash memory devices, such as flash banks 111-114 and 119-122.

A multilevel memory bus system includes an intermediate bus that is disposed to couple to a flash-specific DMA controller and at least one flash buffer circuit. Each flash buffer circuit is disposed to couple to at least one flash memory bus. An intermediate bus permits a plurality of flash buffer circuits to be coupled to a particular flash-specific DMA controller, providing this flash-specific DMA controller access to a flash memory device coupled to the flash memory bus.

In FIG. 1 for instance, multilevel memory bus system 90 includes an intermediate bus 105 coupled to flash-specific DMA controller 103, and flash buffer circuits 107-110. Multilevel memory bus system 90 also includes flash memory buses 80-83, which are coupled to flash buffer circuits 107-110 and flash memory devices arranged in the form of flash banks 111-114, respectively. Similarly, multilevel memory bus system 92 includes an intermediate bus 106 coupled to flash-specific DMA controller 104, and flash buffer circuits 115-118. Multilevel memory bus system 92 also includes flash memory buses 84-87, which are coupled to flash memory devices arranged in the form of flash banks 119-122.

The Intermediate Bus

An intermediate bus, such as 105 or 106, includes a two-bit control path and an n-bit data path, which are not illustrated to avoid overcomplicating the herein invention. The two-bit wide control path functions as the medium for transmitting a two-bit encoded command, named "control command", to a flash buffer circuit. Using a two-bit encoded command is not intended to be limiting, and may be of any size or width although in the current embodiment the control command size matches the width of the control path.

The n-bit data path functions as the medium for transmitting address, data, and command information. The address, data, and command information transmitted or asserted on this n-bit data path are interpreted according to the control command that is asserted concurrently on the control path.

Address Information Asserted on N-Bit Data Path of Intermediate Bus

The address information reflects the physical address of the target memory location on a flash memory device that is targeted to receive a memory operation pertaining to the memory transaction received from a host, such as host 100 FIG. 1.

Data Information Asserted on N-Bit Data Path of Intermediate Bus

Data information can either be raw data or data used to confirm the integrity of the raw data, such as CRC data. Raw data is data that is or will be written to or read from the targeted flash memory device, the internal data buffer of the flash buffer circuit, or both. In one embodiment of the present invention, raw data represents the data subject to a write or read memory transaction received form a host, such as host 100 in FIG. 1.

Command Information Asserted on an N-Bit Data Path of the Intermediate Bus

Command information includes two general types of commands. The first type of command information includes memory device commands native to the type of memory device used. The flash buffer circuit receives these memory device commands from a flash-specific DMA controller via the n-bit data path and forwards it to a targeted flash memory device. For example in FIG. 1, NAND flash memory devices are used and thus native commands may be commands that comply with the ONFI or NVMHCI protocol. The second type of command information includes flash buffer commands that cause a flash buffer circuit to enter a specific state or perform a specific function, such as by performing a write loopback operation as disclosed below. After receiving information on the n-bit data path and interpreting this information as a flash buffer command, the flash buffer circuit performs the command rather than forward the command to a targeted flash memory device.

The n-bit data path has a width of four bits, named "nibble-wide" although the width of this data path is not intended to be limiting in any way and any width may be used. In an alternative embodiment, n-bit data path may have a width of eight bits.

The intermediate bus further includes additional signal paths for transmitting a clock signal, a bus reset signal, a busy signal, a data/CRC select signal, data parity information, and an acknowledge signal, which are used for handshaking between a flash buffer circuit and a flash-specific DMA controller within a multilevel bus. These signals are used with a multilevel bus protocol for providing the communication and handshaking framework on each multilevel bus employed by storage device 94. The address, data, and command information are asserted on the n-bit data path through time multiplexing by clock sequencing and by using additional signals transmitted on the intermediate bus. In an alternative embodiment of the present invention, a multilevel bus protocol that relies on packetized information on the multilevel bus to pass commands, address and data may be used to reduce the number of additional signal paths.

Flash Memory Bus

A flash memory bus, such as any one of flash memory buses 80-87, also includes an n-bit data path for passing the sequenced commands, address and data information received from a flash-specific DMA controller to a flash memory device coupled to the flash memory bus. Each flash memory bus also includes chip select lines and busy signal lines as further disclosed herein.

Local processor 101 responds to memory transaction requests, such as a read or write transaction request received through host interface 98 from external host 100 by initiating a flash memory operation on a flash memory device in a flash bank that is subject to the memory transaction request, such as flash bank 114, by issuing a high level request to flash-specific DMA controller 103. If another DMA controller is utilized, local processor 101 can request another flash memory operation by sending a high level request to that additional DMA controller, such as flash-specific DMA controller 104 without waiting for the prior issued high level request to complete. Multiple flash memory operations that overlap in time can thus be initiated by local processor 101 improving storage device performance by increasing data throughput, reducing memory operation latency, or both, for each flash memory operation performed in response to a memory transaction request received from host 100.

Flash-specific DMA controller 103 translates the high level request into a sequence of command and address bytes. Flash-specific DMA controller 103 also transmits these command and address bytes through intermediate bus 105. Flash-specific DMA controller 103, by means of a multilevel bus protocol, selects a target flash buffer circuit, such as 110, and transmits these command and address bytes to this target flash buffer circuit. A flash-specific DMA controller as disclosed herein transfers not only data as in a conventional DMA controller, but also generates this sequence of command and address bytes. Flash buffer circuit 110 receives these commands, addresses, and data from flash-specific DMA controller 103 and passes these command, addresses, and data to the flash memory device in flash bank 114 that is subject to the memory transaction request. Flash buffer circuit 110 also receives the control command sent through the control path and decodes and performs this control command by using state machines to manage multiple cycle command sequences.

Figure 2:
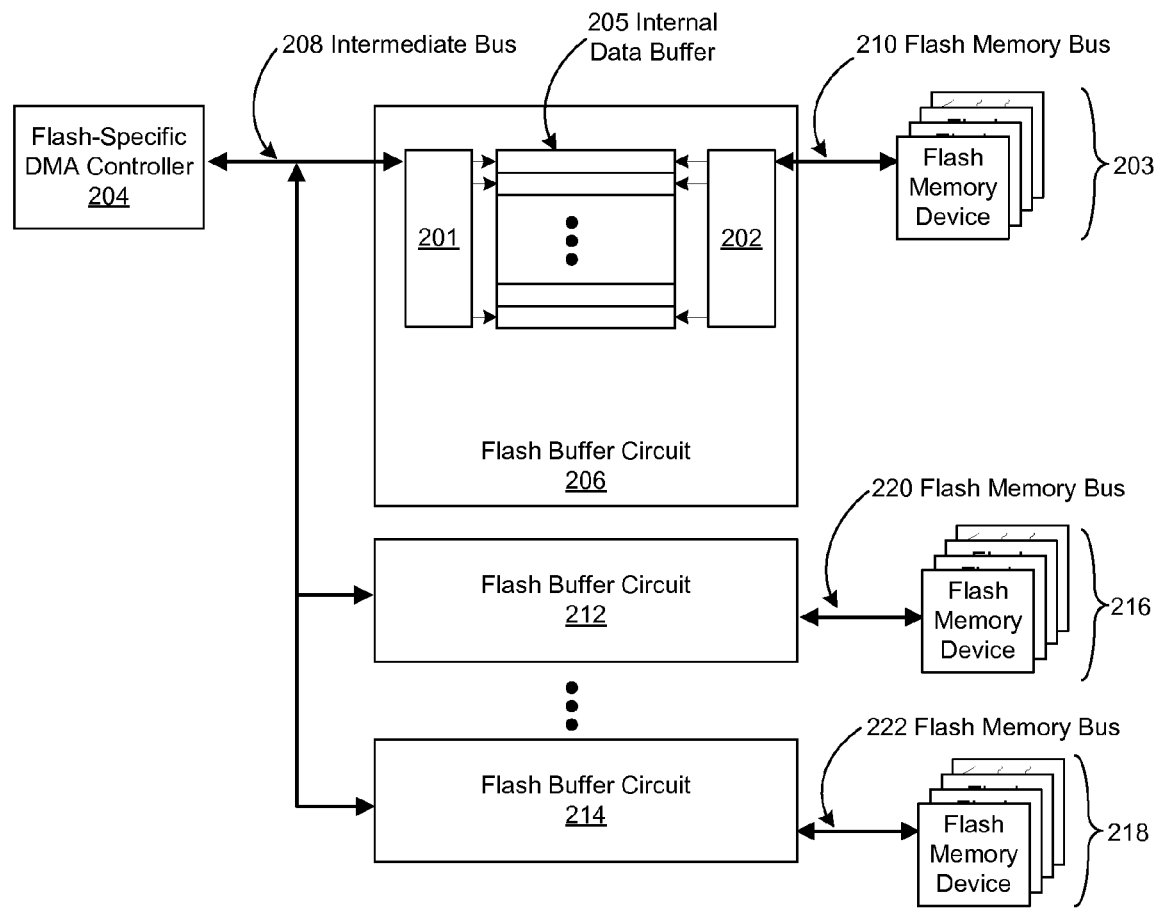
FIG. 2 shows an integrated circuit, named "flash buffer circuit", that includes an internal data buffer that may be used with the multilevel memory bus system disclosed in FIG. 1 in accordance with another embodiment of the present invention.

A flash buffer circuit shown in FIG. 1 may be implemented as disclosed in FIG. 2 in accordance with yet another embodiment of the present invention. A flash buffer circuit 206 includes an intermediate bus interface 201, a flash memory bus interface 202, and an internal data buffer 205. Intermediate bus interface 201 couples flash buffer circuit 206 to a flash-specific DMA controller 204 through an intermediate bus 208, while flash memory bus interface 202 couples flash buffer circuit 206 to flash memory devices, such as the flash memory devices comprising flash bank 203, through a flash memory bus 210. Although only a single flash bank is shown, more than one flash bank (not shown) having a plurality of memory devices may be coupled to flash buffer circuit 206 via flash memory bus 210. Intermediate bus 208 and flash memory bus 210 are substantially similar in function and form as intermediate bus 105 or 106 and any one of flash memory buses 80-87, respectively, in FIG. 1. As previously disclosed, additional flash buffer circuits, such as 212 and 214, may be coupled to an intermediate bus 208, and these additional flash buffer circuits are each coupled to flash banks, such as 216 and 218, that have a plurality of memory devices via memory buses 220 and 222, respectively.

Intermediate bus interface 201 is disposed to pass command, address, and data information received from flash-specific DMA controller 204 through intermediate bus 208 to flash memory bus interface 202. For write transactions, intermediate bus interface 201 passes data information received from the n-bit data portion of intermediate bus 208 to internal data buffer 205, which is buffered by flash buffer circuit 206, enabling burst transfers of this data information to be performed across intermediate bus 201 when a pre-defined internal buffer write threshold is met. Similarly, for read transactions, flash memory bus interface 202 passes data information read from a flash memory device through flash memory bus 210 to internal data buffer 205, enabling burst transfers of this read data information across the n-bit data portion of intermediate bus 201 when a pre-defined internal buffer read threshold is met. These pre-defined internal buffer write and read thresholds may be the same or different depending on the configuration of the multilevel memory bus system, such as the number of flash buffer circuits, flash memory devices and concurrent memory operations that may be initiated by flash-specific DMA controller 204.

Each flash memory device coupled to flash buffer circuit 206 is provided with its own chip enable select signal line, and a set of common control lines disposed to receive control signals, and a data path, which are shown in the form of flash memory bus 210. The use of internal data buffer 205 is not intended to limit the invention disclosed herein. A flash buffer circuit that does not support burst data transfers, use an internal data buffer, or both may also be used with a multilevel bus. For instance, the flash buffer circuits disclosed in FIG. 1 may be implemented using the flash buffer chip disclosed in FIG. 4 of the patent.

Each flash memory device, such as flash memory devices that are associated with the same flash bank and that are coupled to the same flash buffer circuit, each have a dedicated chip enable signal, allowing the flash buffer circuit to select one of these flash memory devices for a given memory operation, such as a write or read operation. Other control signals, such as address latch enable, command latch enable, write enable, read enable may be shared by each group or bank of flash memory circuits that are coupled to the same flash memory bus, such as flash memory bus 210. Driving these control signals are ignored by each of these flash memory devices except for the flash memory device that has its chip enable asserted.

Bursting write or read data information across the n-bit data path of intermediate bus 208 provides many advantages although such advantages are not intended to limit other embodiments of the invention that are within the scope and spirit of the disclosure herein. For instance, bursting data reduces the number of flash-specific DMA controller 204 transactions that would otherwise be required if a non-bursting or cut-through transaction is instead used. Bursting data also reduces the number of instructions that must be sent by a local processor, such as local processor 101 in FIG. 1, to flash-specific DMA controller 204. These advantages are not intended to limit the scope and spirit of the invention in any way.

The internal data buffer 205 allows intermediate bus 208 and memory buses 210 to operate at their maximum supported frequency even if their respective interface data throughputs differ.

A flash buffer chip allows a relatively large number of memory devices, such as NAND flash memory devices, to be added to the multilevel bus enabling memory capacity expansion and avoiding undue loading of the intermediate bus. Multiple flash buffer circuits attached or coupled to a single intermediate bus presents a variety of design and operationally issues, such as bus loading issue, operating frequency, reflections, unpredictable delay paths, and other physical limiting factors. Implementing a relatively wide intermediate bus hinders the bus from operating at higher frequencies and presents unpredictable data delay paths. Implementing a relatively narrow intermediate bus, on the other hand, enables the bus to operate at a higher frequency than a wider bus but a narrower bus will have a lower data throughput rate for a given frequency compared to the wider bus. The design of the multilevel bus, such as multilevel memory bus system 90 or 92, permits different n-bit data path widths to be used by the intermediate and memory buses that form part of the multilevel bus. In one embodiment of the present invention, an n-bit data path of an intermediate bus is disposed with a nibble width, while the n-bit data path of a flash memory bus is disposed with a byte width.

The bus width selected for the n-bit data path of the flash memory bus may be based on the following factors: the desired type and number of flash memory devices used. The bus width selected for the n-bit data path of an intermediate bus, however, may be based on the level of memory performance desired for a storage device using the multilevel bus. Some of the capacity and performance level variations include: high-capacity and high-performance, high-capacity and low-performance, low-capacity and high-performance, or low-capacity and low-performance. Besides bus width, other factors related to capacity and performance level variations include but are not intended to be limited to: the bus clock frequency of the intermediate bus, named "intermediate bus clock frequency; the internal data buffer size, such as 205, used by a flash buffer circuit; and the bus clock frequency of the flash memory bus 210, named "memory bus clock frequency".

Figure 3:
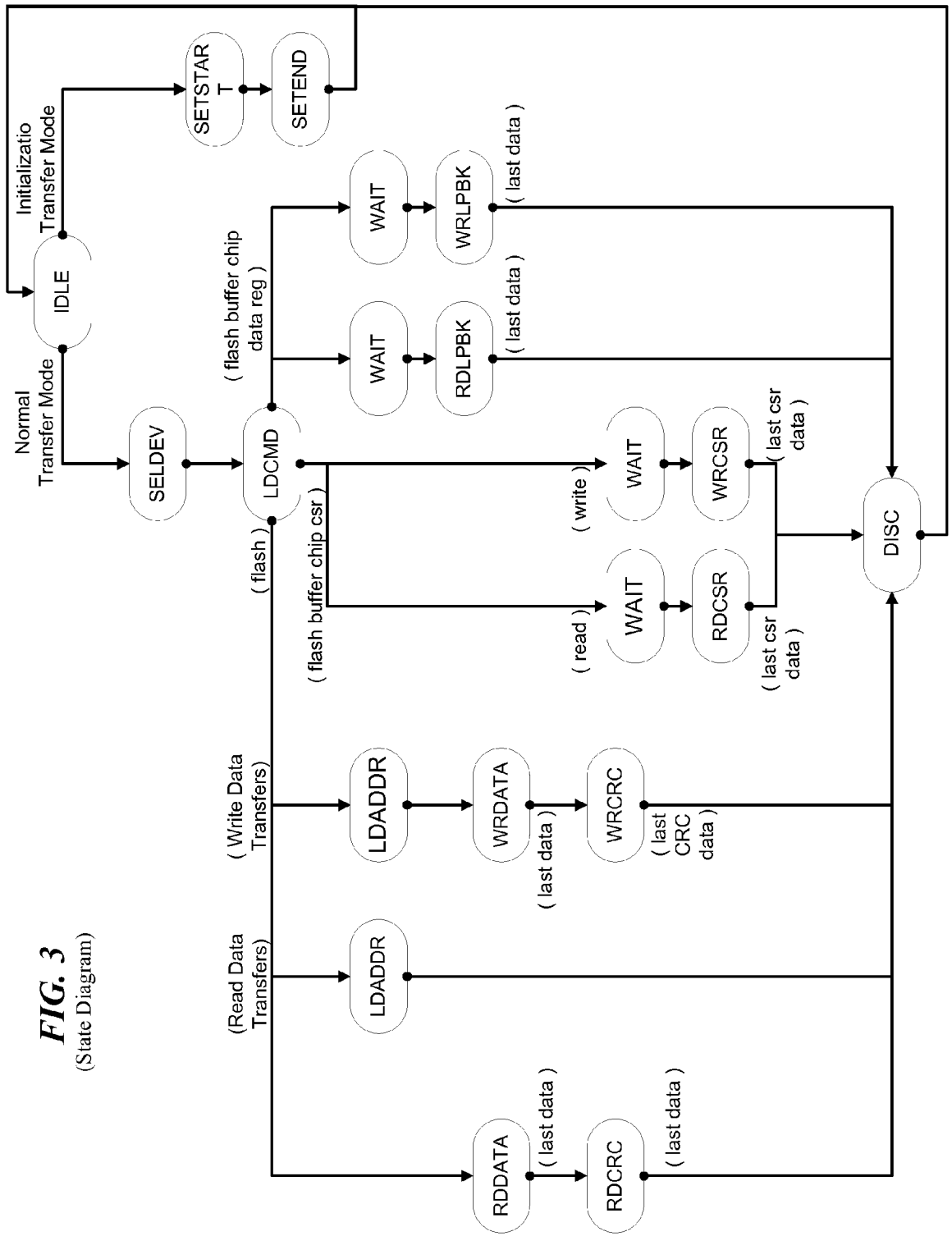
FIG. 3 shows a state diagram for use with a bus, such as the multilevel memory bus system illustrated in FIG. 1 in accordance with yet another embodiment of the present invention.

Each flash-specific DMA controller includes at least one state machine. Each state machine used for a flash-specific DMA controller enables a flash-specific DMA controller to generate the command, address and data information sent through the multilevel memory bus system in response to a memory transaction request. A flash-specific DMA controller disposed with more than one state machine can generate multiple sets of command, address and data information, enabling the flash-specific DMA controller to interleave memory operations on flash memory devices coupled to the multilevel memory bus system. A state machine may be implemented as illustrated by the state diagram in FIG. 3. Two types of transfer modes are defined for an intermediate bus, including the initialization transfer mode (ITM) and the normal transfer mode (NTM).

The SETSTART and SETEND states

Initialization of each plurality of flash buffer circuit in the flash memory system is carried out in the initialization transfer mode. The initialization transfer mode includes the SETSTART and SETEND states where the extent of each flash buffer circuit in terms of the number of flash memory devices coupled to it is set. The flash buffer circuit is assigned its Start Group number in the SETSTART state whereas the End Group number for this flash buffer circuit is assigned in the SETEND state. The SETEND state causes the intermediate bus to return to the IDLE state. The IDLE state informs the flash-specific DMA controller that the intermediate bus is free and thus, available for other transactions.

The SELDEV ("Select Device") and LDCMD ("Load Command") States

All other types of transactions are handled through the intermediate bus normal transfer mode. Transactions in normal transfer mode are initiated with the SELDEV state. In this state, one of the flash buffer circuits coupled to the flash-specific DMA controller is selected, which locks the intermediate bus to this flash buffer circuit. In effect, this flash buffer circuit now has ownership of the intermediate bus. If the transaction involves a flash memory device operation, one of the flash memory devices coupled to the selected flash buffer circuit is likewise chosen in the SELDEV state through a unique group number associated with the selected flash memory device. Following the flash buffer circuit selection, and a flash memory device selection if the transaction involves a flash memory device operation, the intermediate bus enters the LDCMD state, which causes the flash-specific DMA controller to assert the command information on the n-bit data portion of the intermediate bus.

The flash-specific DMA controller uses flash buffer commands, which is one type of command information, to cause the flash buffer circuit to respond in a manner designed for the current transaction that will be performed by the flash-specific DMA controller. In one embodiment of the present invention, the flash-specific DMA controller asserts these flash buffer commands on the n-bit data path in portions equal to the width of the n-bit data path. Since the flash buffer commands are in byte size widths, these flash buffer commands may also be referred to as "control bytes". In addition, these flash buffer commands are received by the flash buffer circuit but are not forwarded by the flash buffer circuit to a flash memory device. Transmitting a flash buffer command during the LDCMD state will cause the intermediate bus to transition to either a flash buffer circuit configuration register related state, such as the WRCSR ("write configuration and status register") or RDCSR ("read configuration and status register") state, or a flash buffer circuit data buffer related state, such as the WRLPBK ("write loopback") or RDLPBK ("read loopback") states.

The flash-specific DMA controller transmits memory device commands, to perform write or read operations on flash memory devices as a response to an external request by a host device 100. As noted previously, memory device commands are another type of command information that are passed on the n-bit data path of the intermediate bus, such as intermediate bus 105 or 106 in FIG. 1. In one embodiment of the present invention, the flash-specific DMA controller asserts these memory device commands, which are in byte size widths, on the n-bit data path in portions equal to the width of the n-bit data path. Since the memory device commands are in byte size widths, these memory device commands may also be referred to as "command bytes." In addition, these memory device commands are received by the flash buffer circuit and forwarded by the flash buffer circuit to a flash memory device. After passing these memory devices commands to a flash buffer circuit, flash-specific DMA controller enters the LDADDR ("load address") state.

The WRCSR ("Write Configuration and Status Register") State

The flash-specific DMA controller is disposed to configure the current settings of a flash buffer circuit. For this type of transaction, the flash-specific DMA controller issues the "WRCSR control byte" during the LDCMD state. The flash-specific DMA controller then enters the WRCSR state wherein it sends the control settings of the flash buffer circuit over the n-bit data path of the intermediate bus to the flash buffer circuit. In the example in FIG. 1, these control settings have byte size widths and are transferred in nibble-sized portions if the n-bit data path is disposed to have a nibble wide width. The control settings are stored in the configuration register set used by the flash buffer circuit. Transfer of the last set of configuration data will trigger the DISC (disconnect) state, which will eventually cause the flash-specific DMA controller to cause the intermediate bus to enter the IDLE state.

The RDCSR ("Read Configuration and Status Register") State

The flash-specific DMA controller is also disposed to determine the current settings of a flash buffer circuit. During the LDCMD state, the flash-specific DMA controller issues a flash buffer command on the n-bit data path to a flash buffer circuit. This flash buffer circuit treats the flash buffer command as indicating that the flash-specific DMA controller wishes to obtain the control settings of the flash buffer circuit. This flash buffer command may be referred to as a "RDCSR control byte". When the flash buffer circuit receives this type of flash buffer command, the flash buffer circuit enters the RDCSR state. During this state the flash buffer circuit sends through the intermediate bus the contents of its configuration register to the flash-specific DMA controller. In the example in FIG. 1, these control settings have byte size widths and are transferred in nibble-sized portions if the n-bit data path is disposed to have a nibble width. These control settings may be information stored in a register set used by the flash buffer circuit. Transfer of the last set of configuration data will trigger the DISC state, which will eventually cause the flash-specific DMA controller to cause the intermediate bus to enter the IDLE state.

Accessing the Internal Data Buffer of a Flash Buffer Circuit

An internal data buffer within a flash buffer circuit is accessible by the flash-specific DMA controller. A request to write on the internal data buffer through the WRLPBK ("write loopback") control byte will cause the flash-specific DMA controller to cause the intermediate bus to enter the WRLPBK state, also referred to herein as a write loopback operation. The flash-specific DMA controller sequentially transmits the data information across the n-bit data portion of the intermediate bus. A request to read from these data buffers through the RDLPBK ("read loopback") control byte, on the other hand, will put the intermediate bus in the RDLPBK state, also referred to herein as a read loopback operation. Under the RDLPBK state, data from the internal data buffer of the flash buffer circuit is transferred to the flash-specific DMA controller. In both cases, transfer of the last set of data will trigger the DISC state, which will eventually cause the flash-specific DMA controller to cause the intermediate bus to enter the IDLE state, which is the default state. The present invention may be implemented with the use of these write and read loopback operations. Loopback operations may be employed by a local processor system, such as local processor system 96 in FIG. 1, for diagnostic purposes, which may include checking the integrity of an internal data buffer of a flash buffer circuit.

For a write or read transfer to or from a flash memory device, the LDCMD state leads to the LDADDR state. In this state, the flash-specific DMA controller transmits the address bytes on the n-bit data portion of the intermediate bus. The selected flash buffer circuit in the SELDEV state transfers the address bytes from the intermediate bus to the flash memory device through the flash memory bus.

The flash buffer circuit informs the flash-specific DMA that the internal data buffer is ready, such as when the buffer satisfies a pre-determined threshold, by asserting an acknowledge signal on the acknowledge signal path of the intermediate bus, such as intermediate bus 105 or 106 in FIG. 1. Upon receiving the acknowledge signal, the flash-specific DMA controller can then cause the intermediate bus to enter into the WRDATA state by asserting a Data/CRC signal on the intermediate bus. (Note that in a read/write bursting embodiment, the flash memory bus will also enter the write data state if the pre-defined threshold in the internal buffer is satisfied.) The flash-specific DMA controller then executes write data cycles on the intermediate bus until it transmits an entire page of data information from the flash-specific DMA controller to the flash buffer circuit that is coupled to the flash memory device(s) targeted to receive the page of data information. After the data information is transmitted, the flash-specific DMA controller de-asserts the Data/CRC signal, which causes the intermediate bus to enter the WRCRC state. During the WRCRC state, the flash-specific DMA controller transmits four (4) bytes of CRC information, for data integrity, to the flash buffer circuit. Once the flash buffer circuit receives the bytes for the data information and CRC, the DISC state is entered which involves the flash buffer circuit disconnecting from the flash-specific DMA controller. After this disconnection, the intermediate bus returns to the IDLE state.

For read data transfers, the LDADDR state causes the intermediate bus to enter the DISC state. At this time, the addressed flash memory device is busy transferring data from the flash memory device memory array to the flash memory device's internal data register. The selected flash buffer circuit in the SELDEV state releases its control of the intermediate bus, causing the intermediate bus to return to its IDLE state. This renders the intermediate bus available for other transactions that the flash-specific DMA controller may initiate on other flash buffer circuits. Meanwhile, the flash-specific DMA controller monitors the busy signal from the addressed flash memory device. The flash-specific DMA controller will arbitrate for the intermediate bus once this monitored flash memory device becomes ready again, which will once again link the flash-specific DMA controller to the flash buffer circuit that is coupled to the monitored flash memory device.

After a pre-selected amount of data has been stored in the internal data buffer of the flash buffer circuit, the flash buffer circuit asserts a Data/CRC signal on the Data/CRC signal line of the intermediate bus, causing the flash-specific DMA controller to enter the RDDATA state. During the RDDATA state, data from the internal data buffer of the flash buffer circuit is transmitted to the flash-specific DMA controller across the intermediate bus common to the flash-specific DMA controller and the flash buffer circuit. After this data is transferred, the flash-specific DMA controller enters the RDCRC state and causes the transfer of four (4) bytes of CRC data from the flash buffer circuit to the flash-specific DMA controller. After the CRC data is received, the flash-specific DMA controller enters the DISC state, which results in the flash-specific DMA controller to free the intermediate bus from its locked status with the flash buffer circuit, and to return the intermediate bus to the IDLE state.

Figure 4A:
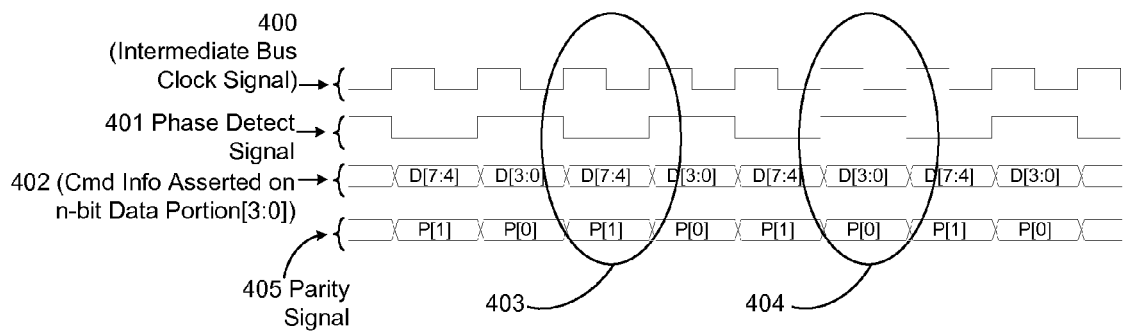
FIGS. 4A through 4D show various timing diagrams for use with a nibble-wide n-bit data path or bus during control and data transfers in accordance with yet another embodiment of the present invention.

FIGS. 4A through 4D show various timing diagrams for a nibble-wide bus during control and data transfers in accordance with yet another embodiment of the present invention. Transferring 8-Bit Command Information Across a Nibble Wide N-bit Data Path of an Intermediate Bus in a Multilevel Memory Bus System FIG. 4A shows the timing diagram of signals passed through an intermediate bus having a nibble-wide n-bit data path during the transfer of command information to a flash buffer circuit. The transfer of command information across the intermediate bus and to a flash buffer circuit may also be herein referred to as the command transfer phase. In this example, each item of command information has an eight (8) bits or a single byte width size but the n-bit data path is only a nibble-wide bus. Consequently, the flash-specific DMA controller, or the flash buffer circuit, needs at least two intermediate bus clock cycles to transfer a single byte of command information when performing either a write or read operation as part of a requested memory transaction.

Four types of signals are illustrated in FIG. 4A, an intermediate bus clock signal 400; a phase detect signal 401; a stream or train of eight (8) bit control data 402, each of which is asserted in nibble-wide portions on a nibble-wide n-bit data path of an intermediate bus; and a parity information, such as parity signal 405. In one embodiment of the present invention, a flash-specific DMA controller generates intermediate bus clock signal 400.

Phase detect signal 401 is an internally generated signal internal to the flash-specific DMA controller and the flash buffer circuit. Phase detect signal 401 of the flash-specific DMA controller and the flash buffer circuit are synchronized by a bus reset signal (not shown), which is sent on a bus reset signal line (not shown) forming a portion of the intermediate bus that couples the flash-specific DMA controller and flash buffer circuit.

The device, such as the flash-specific DMA controller or the flash buffer circuit, that will be sending the data information across the nibble width n-bit data path asserts the phase detect signal 401 on the phase detect signal path (not shown). As illustrated in time period 403, bringing phase detect signal 401 low, signifies that the nibble of control data on the n-bit data path is the upper nibble of the byte information being transmitted. This upper nibble portion of the command data can then be sampled by the flash buffer circuit, during a clock cycle of the intermediate bus clock signal 400 that coincides with the phase detect signal 401, which is asserted low during time period 403.

In time period 404, phase detect signal 401 is brought high, signifying that the nibble information on the n-bit data path is the lower nibble of data information. This lower nibble portion of the command data can then be sampled by the flash buffer circuit, during a clock cycle of the intermediate bus clock that coincides with the phase detect signal 401, which is asserted high, during time period 404.

Figure 4B:
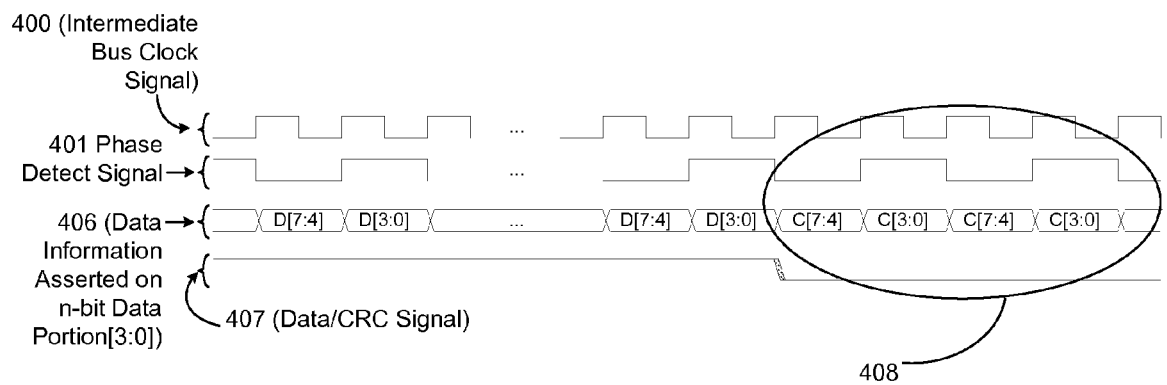

Therefore, one complete period or cycle of phase detect signal 401 is used for each byte of command information data transferred in the embodiment shown in FIG. 4A. This command information is also protected by parity information 405. This parity information is driven by the flash-specific DMA controller on a parity signal path (not shown) that forms part of the intermediate bus. The signals for control commands sent on the control path of the intermediate bus are not shown in FIG. 4A to avoid overcomplicating this disclosure.
Transferring 8-Bit Data Information (Raw Data and CRC Data) Across a Nibble Wide N-bit Data Path of an Intermediate Bus in a Multilevel Memory Bus System FIG. 4B is a timing diagram illustrating the relationship between certain signals that are used during the transfer of raw data, such as read or write data, and CRC data across a nibble-wide n-bit data path portion of an intermediate bus in accordance with yet another embodiment of the present invention. Four types of signals are illustrated in FIG. 4B, an intermediate bus clock signal 400; a phase detect signal 401; a stream of (8) bit data information 406; each of which is asserted in nibble-wide portions on a nibble-wide n-bit data path of an intermediate bus; and a Data/CRC signal 407.

Either the flash-specific DMA controller or the flash buffer circuit controls the Data/CRC signal 407, depending on which device controls the n-bit data path. Data/CRC signal 407 indicates if the data information asserted on the n-bit data path of the intermediate bus is raw data, such as read or write data, or CRC data. CRC data is used to protect the transfer of this raw data across the n-bit data path of the intermediate bus. In the embodiment shown, when asserted high, Data/CRC signal 407 signifies that the signal presented on the n-bit data path is raw data. During time period 408, de-asserting or bringing Data/CRC signal 407 low signifies that the data information presented on n-bit data path portion is CRC data.

Figure 4C:
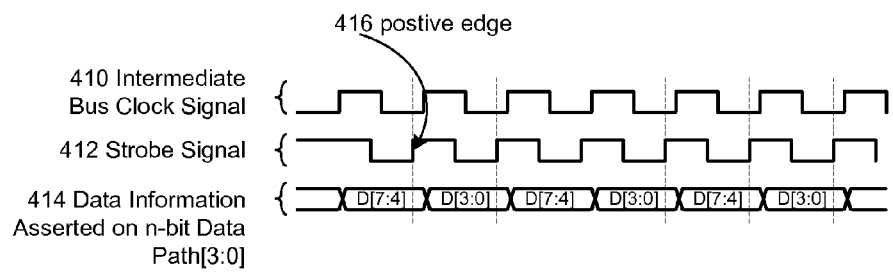
Figure 4D:
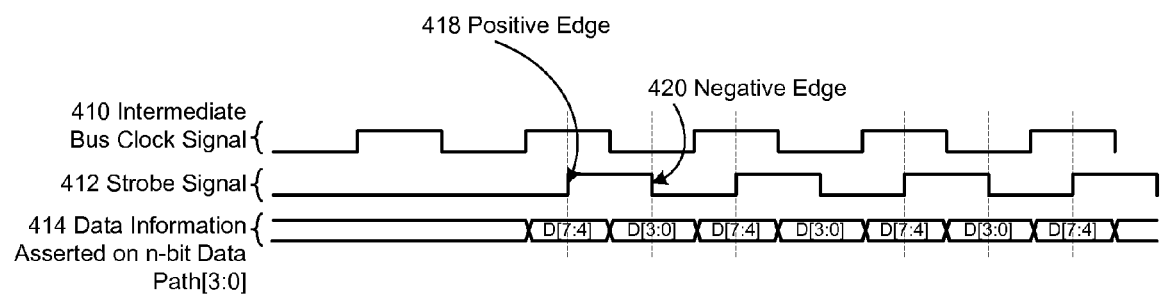

FIGS. 4C and 4D illustrate timing diagrams for sampling data on an n-bit data path of an intermediate bus, such as intermediate bus 105 or 106 in FIG. 1.
Single Data Sampling FIG. 4C illustrates a timing diagram for single rate data sampling, named "single data sampling" in accordance with another embodiment of the present invention. FIG. 4C includes an intermediate bus clock signal 410, a strobe signal 412 which has a positive edge and a negative edge during every strobe signal clock period or cycle, and a set or stream of data information 414. Data information 414 can either be raw data or CRC data, and is sampled by the device that will receive the data on every positive edge 416 of the strobe signal per strobe signal clock period or cycle. The granularity of the data information sampled during each clock cycle or period of strobe signal 412 has a size equal to the width of the n-bit data path, which in the embodiment below is set to a nibble width or four (4) bits.
Double Data Sampling FIG. 4D illustrates a timing diagram for double rate data sampling, named "double data sampling" in accordance with yet another embodiment of the present invention. FIG. 4D includes an intermediate bus clock signal 410, a strobe signal 412 which has a positive edge and a negative edge during every strobe signal clock period or cycle, and a set or stream of data information 414. Data information 414, unlike in FIG. 4C, is sampled by the device that will receive the data on every positive edge 418 and negative edge 420 of the strobe signal per strobe signal clock period or cycle.

In the embodiments shown in FIGS. 4C and 4D, single or double data sampling only occurs during the transfer of raw data and CRC data across the intermediate bus. This type of transfer is referred to as the data transfer phase. In addition, using strobe signal 412 to coordinate data sampling only occurs during the data transfer phase.

Figure 5A:
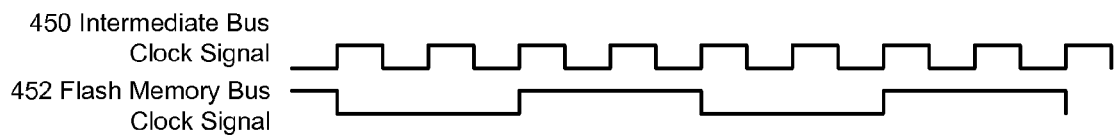
FIGS. 5A and 5B show possible data rates that may be employed on an intermediate bus and flash memory bus in accordance with a further embodiment of the present invention.
Figure 5B:
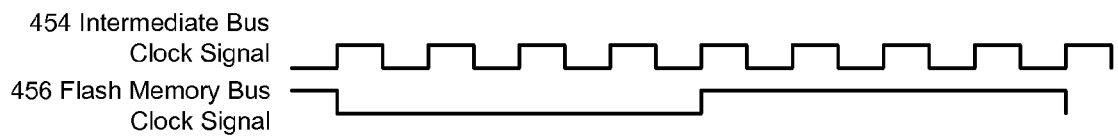

The intermediate bus and flash memory bus are not limited to fixed bus clock frequencies. For instance, the intermediate bus may be disposed to use an intermediate bus clock signal that has a frequency that is different from the frequency of the flash memory bus clock signal. FIGS. 5A and 5B show possible bus clock signal rates or frequencies that may be employed on the intermediate and flash memory device buses that form a portion of a multilevel memory bus system, such as the multilevel memory bus system 90 or 92 disclosed previously in FIG. 1, in accordance with a further embodiment of the present invention. FIG. 5A includes an intermediate bus clock signal 450 having a clock frequency that is four (4) times the clock frequency of a flash memory bus clock signal 452, while FIG. 5B includes an intermediate bus clock signal 454 having a clock frequency that is eight (8) times the clock frequency of a flash memory bus clock signal 456. The bus clock frequency used by an intermediate bus or by a flash memory bus is herein also referred to as the bus operational frequency.

In one embodiment of the present invention, data is asserted in n-bit portions on the n-bit data path of the intermediate bus or the flash memory bus on every bus clock cycle. This data may include data information, including raw data, CRC data or both. The amount of data per second, named "data rate", that is asserted on a bus is equal to the product of the bus operational frequency and the n-bit data portion size that is asserted on the bus per clock cycle. For instance, during a write transaction, a flash-specific DMA controller asserts data information at n-bit portions on intermediate bus having an n-bit data path on every intermediate bus clock cycle. Similarly, during a read transaction, a flash memory device asserts raw data, which it obtained from its memory cell(s), on the flash memory bus every flash memory bus cycle.

In another example and depending on the type of memory transaction, the flash buffer circuit asserts data information on the intermediate bus on every intermediate bus clock cycle and asserts data information on the flash memory bus on every flash memory bus clock cycle. The memory bus cycles of the intermediate bus and the flash memory bus are independent and may be different from each other although their lack of dependency and their differences are not intended to limit the present invention in any way.

The intermediate bus clock frequency can be set at least equal to the flash memory bus clock frequency. Dividing the intermediate bus clock frequency by the flash memory bus clock frequency provides a quotient value that is referred to as the intermediate bus "frequency factor" when round to the lowest integer. This frequency factor may be used when describing the intermediate bus data rate. For example, if the intermediate bus has a data rate equal to the flash memory bus, then the intermediate bus is defined herein to have a single data rate, named "SDR" because the frequency factor in this example is equal to one (1). In another example, if the intermediate bus has a data rate that is double the data rate of the flash memory bus, then the intermediate bus that includes these buses is defined herein to have a double data rate, named "DDR", since the frequency factor in this example is equal to two (2).

In FIG. 5A and using relative time periods, the frequency of intermediate bus clock signal 450 differs from the frequency flash memory bus clock signal 452 by an integer multiple of four (4), and thus, results in an intermediate bus having a quad data rate, named "QDR". In FIG. 5B and using relative time periods, the frequency of intermediate bus clock signal 454 differs from the frequency flash memory bus clock signal 456 by an integer multiple of eight (8), and results in an intermediate bus having an octal data rate, named "ODR".

The invention is not intended to be limited to the data rates described, and one of ordinary skill in the art would readily recognized that other data rates may be utilized, depending on the capabilities of the multilevel bus. Also, in one embodiment of the present invention, each flash memory bus coupled to the same flash buffer circuit may be set to use the same operational frequency or bus signal frequency.

To maximize the data throughput of the intermediate bus when its data rate is set to be an integer multiple greater than one, such as for data rates greater than a signal data rate, it is contemplated that a flash-specific DMA controller is disposed with more than one state machine so that more than one memory device can perform a memory operation, enabling concurrent memory operations to be performed and fully utilizing the data rate of the intermediate bus.

The data throughput of the multilevel memory bus system can be adapted according to a variety of factors, including the solid-state memory capacity desired; bus loading; the technology level of semiconductor technology, including memory devices; the integrity of data subject to a memory operation through the multilevel bus; or any combination of these. For example, ODR transfers might be inefficient due to signaling or data integrity errors that may occur for a heavily loaded system. The intermediate bus can then be downgraded to QDR, DDR, or SDR, whichever provides the highest reliable data throughput. But for a light loaded multilevel bus, the data throughput can be maximized by using ODR on the intermediate bus.

The general equation to compute for the data throughput of the intermediate bus interface and the flash memory bus interface for the various data transfers are given below:

$$IBUS_{Throughput} = DataWidth\_IB \times FREQFactor \times FREQ \times DS$$

$$FMBUS_{Throughput} = DataWidth\_FMB \times FREQ$$

Where:

$IBUS_{Throughput}$ is the intermediate bus interface data throughput.

$FMBUS_{Throughput}$ is the flash memory bus interface data throughput

DataWidth_IB is the width of the n-bit data path of the intermediate bus.

DataWidth_FMB is the width of the n-bit data path of the flash memory bus.

FREQ is the operating frequency of the flash memory bus, which is equal to the flash memory bus clock frequency.

FREQFactor is the intermediate bus frequency factor.

DS is the data sampling used on the intermediate bus. Set this to two (2) for double data sampling and one (1) for single data sampling.

As an example QDR scenario, a intermediate bus having a nibble width n-bit data path with an operational frequency of 133 Mhz, a flash memory bus using an operational frequency of 33 Mhz, double data sampling, and an 8 bit bus interface, would result in a frequency factor of four (4) and the following bus throughputs:

$$IBUS_{Throughput} = \text{DataWidth\_IB} \times FREQFactor \times FREQ \times 2$$
$$= 4 \times 4 \times 33 \text{ MHz} \times 2$$
$$= 1056 \text{ MHz or } 1056 \text{ Mbps}$$

$$FMBUS_{Throughput} = \text{DataWidth\_FMB} \times FREQ$$
$$= 8 \times 33 \text{ Mhz}$$
$$= 264 \text{ MHz or } 264 \text{ Mbps}$$

In this example immediately above, an intermediate bus data throughput that is four (4) times (1056/264) the flash memory bus throughput would mean that the intermediate bus can handle four simultaneous flash memory device operations, significantly increasing the overall performance of the multilevel bus.

For an ODR transfer, the same conditions apply as in QDR transfers except the intermediate bus clock frequency is eight (8) times higher than the flash memory bus. As an example scenario, the intermediate bus is disposed to run in nibble mode, with an intermediate bus clock frequency of 266 MHz while the flash memory bus interface is running in byte mode with a bus frequency of 33 MHz. The n-bit data path width for the intermediate bus and flash memory bus need not be the same. For example, the intermediate bus may be disposed to have a nibble-wide n-bit data path, while the flash memory bus disposed with a byte wide bus width.

For this ODR transfer example, the throughput values are given below:

$$IBUS_{Throughput} = \text{DataWidth\_IB} \times FREQFactor \times FREQ \times 2$$
$$= 4 \times 8 \times 33 \text{ MHz} \times 2$$
$$= 2112 \text{ MHz or } 2112 \text{ Mbps}$$

$$FMBUS_{Throughput} = \text{DataWidth\_FMB} \times FREQ$$
$$= 8 \times 33 \text{ Mhz}$$
$$= 264 \text{ MHz or } 264 \text{ Mbps}$$

The throughput ratio between the intermediate bus and flash memory bus clock frequencies is now eight (8) times higher (2112/264). This means that the intermediate bus has the bandwidth to handle 8 simultaneous flash memory operations, significantly increasing the transfer rate of the multilevel bus.

Figure 6:
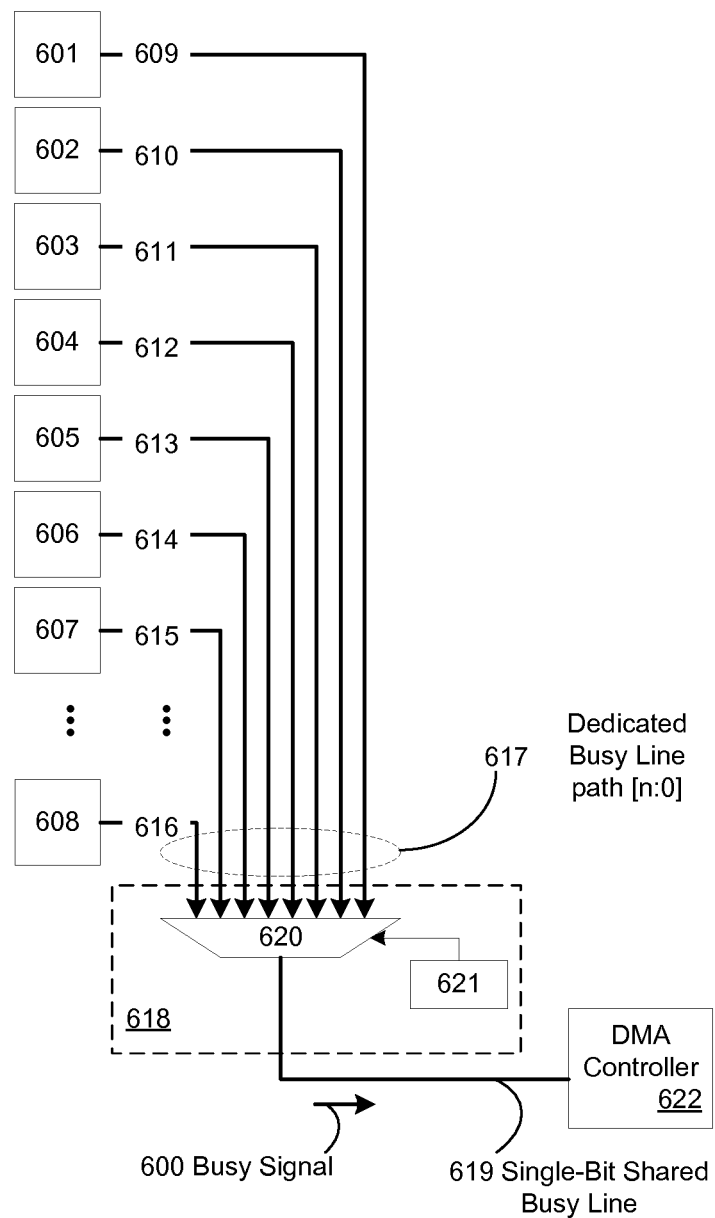
FIG. 6 shows a multiplexed dedicated busy signal line implementation that may be used with a flash memory bus in accordance with yet a further embodiment of the present invention.

To enhance the busy signal monitoring capability of the prior art, the current invention implements a modified mechanism as shown in FIG. 6. For instance, flash buffer circuit 618 is coupled to a set of 609-616, which are respectively coupled to flash memory device 601-608. Dedicated busy lines 609-616 make up the n-bit 617 busy line path of the flash memory bus, such as any one of flash memory bus 80-87 in FIG. 1, that is connected to flash buffer circuit 618. Flash buffer circuit 618 is coupled to flash-specific DMA controller 622 through the intermediate bus, which includes single bit busy line 619. This intermediate bus may be implemented to have the same function as intermediate bus 105 or 106 in FIG. 1. Flash-specific DMA controller 622 is substantially similar in function to flash-specific DMA controller 105 or 106 in FIG. 1.

On every clock period, flash buffer circuit 618 through multiplexer 620 and n-bit counter 621 selects one of the input busy signals asserted on dedicated busy signal lines 609-616 and asserts onto single-bit shared busy line 619 of an intermediate bus, such as intermediate bus 105 or 106 in FIG. 1, busy signal 600. N-bit counter 621 causes multiplexer 620 to select one of the input busy signals and asserts busy signal 600, which reflects the value of the selected input busy signal, on single-bit shared busy line 619. With each increment of the counter 621, the multiplexer 620 selects a different dedicated busy line from n-bit busy line path so that the busy signal asserted on single-bit shared busy line 619 reflects the busy signal asserted on the dedicated busy line selected by multiplexer 620. The n-bit counter 621 is reset to 0 after n clock cycles. In effect, each busy signal, such as busy signal 600, asserted on dedicated busy signal lines 609-616 is selected once every n clock cycles.

Figure 7:
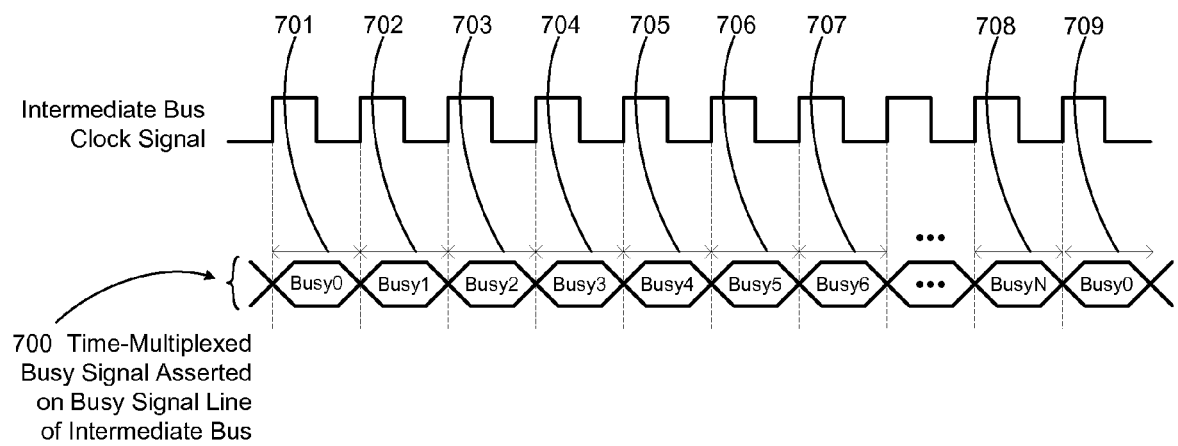
FIG. 7 illustrates a timing diagram for the embodiment illustrated in FIG. 6 in accordance with another embodiment of the present invention.

FIG. 7 illustrates a timing diagram for the embodiment illustrated in FIG. 6 in accordance with another embodiment of the present invention. A time-multiplexed busy signal 700 may be asserted on a single bit busy line, such as single bit busy line 619 in FIG. 6, of an intermediate bus. A different busy signal is driven over intermediate bus on each clock period. Busy0 is the output on the intermediate bus during clock period 701, Busy1 on the next clock period 702, Busy2 on the next clock period 703, and so on until the last busy signal BusyN is driven over the bus on clock period 708. After which, the whole sequence is repeated with Busy0 on the next clock period 709.

Exclusive Busy Signal—Single Flash Buffer Circuit

FIG. 8 illustrates an exclusive busy mechanism that may be used with the implementation illustrated in FIG. 7, in accordance with yet another embodiment of the present invention. A plurality of flash buffer circuits, such as 804-806, are connected to the same flash flash-specific DMA controller, such as 808, through an intermediate bus. Flash-specific DMA controller 808 monitors the single bit shared busy signal line 807 that is coupled to flash buffer circuits 804, 805 and 806. Once this flash-specific DMA controller 808 issues an exclusive busy request for flash buffer circuit 804, for example, the busy line outputs, such as 809 and 810, from the other flash buffer circuits, such as flash buffer circuits 805 and 806, that are not the target of the exclusive busy request are disabled. This ensures that single bit shared busy line 807 is being driven solely by flash buffer circuit 804. Moreover, when implemented with the embodiment shown in FIG. 7, the exclusive busy mechanism in FIG. 8. also ensures that the busy signal which the flash-specific DMA controller receives is the time multiplexed busy signal output from flash bank 801.

The disablement of the flash buffer circuits may be accomplished as described but is not intended to limit the present invention in any way. During the select device phase, flash buffer circuit 804 determines that the exclusive busy request issued by the flash-specific DMA controller is intended for it, resulting in the flash buffer circuit 804 enabling its output control over the shared busy line. At the same time, flash buffer circuits 805 and 806 will disable their respective output control for the shared busy line when they determine that the exclusive busy request is not intended for them.

Exclusive Busy Signal—Single Flash Memory Device

Through the exclusive busy mechanism, and as illustrated in yet a further embodiment of the present invention in FIG. 9, the flash-specific DMA controller 808 can be further programmed to monitor the busy status of a single flash memory device from a flash bank, such as 801, instead of receiving from flash buffer circuit 804 the time-multiplexed busy signal of the entire flash bank 801. Counter 621 in FIG. 6 is set to output a value M that corresponds to the target flash device's busy signal. Consequently, the multiplexer 620 selects the same busy signal, BusyM, on each clock period, such as 901, 902 through 905 of intermediate bus clock signal at the time the flash-specific DMA controller monitors the shared busy line of the intermediate bus.

The exclusive busy mechanism presents several advantages. In the event that several flash buffer circuits are concurrently driving single bit shared busy line 807, this mechanism allows flash-specific DMA controller 808 to monitor the busy output of just one flash buffer circuit, as disclosed with respect to FIG. 8. This eliminates conflicting signals on single bit shared busy line 807, and any corresponding failures that may result from these conflicting signals. Furthermore, as disclosed with respect to FIG. 9, the ability to monitor the status of a single memory device enables the flash-specific DMA controller to initiate another set of operations for the monitored flash memory device immediately once it becomes ready. This offers minimal data transfer latency since the flash-specific DMA controller need not wait for the usual n clock cycles to determine the status of the flash memory device and initiate the succeeding transactions.

The multilevel bus protocol and the features of the scalable mass storage are further described below. The multilevel bus protocol includes at least two transfer modes: an initialization transfer mode, or ITM, and a normal transfer mode, or NTM.

Initialization Transfer Mode

In a mass storage system that includes a plurality of flash memory devices and flash buffer circuits coupled to each flash-specific DMA, an initialization sequence is necessary to render each element in the system to be addressable. This initialization sequence is executed upon system boot-up and reset. In one embodiment and with reference to FIG. 1, flash-specific DMA controller 103 to 104 sets off the initialization sequence for each plurality of flash buffer circuit 107 to 110 and 115 to 118 coupled through intermediate buses 105 and 106 during the initialization transfer mode. Flash-specific DMA controller 103 will initialize flash buffer circuits 107 to 110. Similarly, flash-specific DMA controller 104 will initialize flash buffer circuits 115-118.

The initialization of a flash buffer circuit, such as 107, commences with the flash-specific DMA controller 103 sending a request control command to start initialization. The intermediate bus 105 at this time enters the SETSTART state. In this state, the Start Flash Group number for flash buffer circuit 107 is transmitted over the intermediate bus by flash-specific DMA controller 103 to flash buffer circuit 107. The SETSTART state leads to the SETEND state, where the End Flash Group number for flash buffer circuit 107 is sent over the intermediate bus 105. The Start Flash Group number and the End Flash Group number correspond to the number of flash memory devices in flash bank 111 coupled to flash buffer circuit 107.

Figure 10:
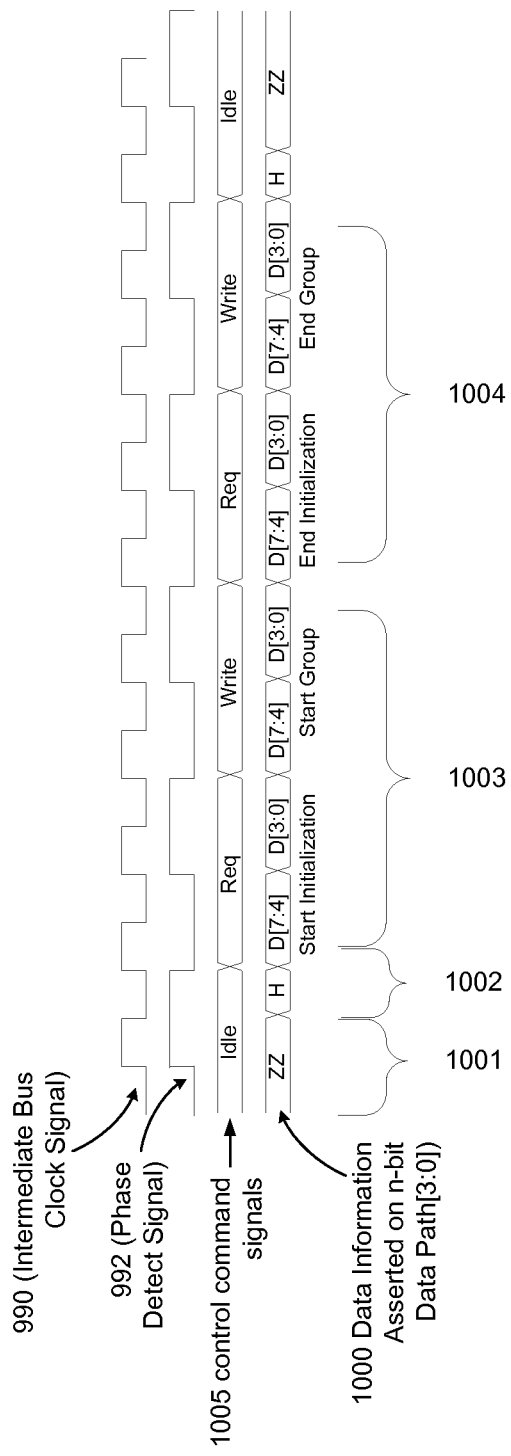
FIG. 10 shows a timing diagram during an initialization transfer mode for a nibble-wide n-bit data path of an intermediate bus in accordance with yet another embodiment of the present invention.

FIG. 10 shows the timing diagram that may occur during the initialization transfer mode for a flash buffer circuit, such as 107, in accordance with yet a further embodiment of the present invention. FIG. 10 includes an intermediate bus clock signal 990 for an intermediate bus, such as intermediate bus 105; a phase detect signal 992; encoded commands, such as control command signal 1005; and data information 1000 asserted on an n-bit data path of intermediate bus 105.

In this example, the n-bit data path of intermediate bus 105 is assumed to be in nibble mode, and command signals 1005 are signals that are transmitted by the flash-specific DMA controller via the two-bit encoded command path, and that are consequently received by the flash buffer circuits. In an alternative embodiment of the invention, command signals 1005 signals may be encapsulated when transferred onto the data bus to support packetized transfers.

Initially, the n-bit data path of intermediate bus 105 is in the high impedance state at time period 1001 before the flash-specific DMA controller or the flash buffer circuit drives intermediate bus 105 with data information 1000. The lines of the n-bit data path are driven from a high impedance state to all logic one (1) at time period 1002 before driving it to the valid data value. Termed as sustained tri-state, this eliminates the slow switching speed of the bus when it transitions from high-impedance state during time period 1001 to a valid logic value.

Time period 1003 shows the SETSTART state of intermediate bus 105, and illustrates the flash-specific DMA controller sending a request command followed by a write command, which are control commands asserted on the control path of intermediate bus 105. The data information presented on the n-bit wide data path during the request command is a flash buffer command that initiates the Start Initialization routine. When presented concurrently in time period 1003, the request command and flash buffer command to begin the Start Initialization routine by signifying to the flash buffer circuit receiving these signals that the flash-specific DMA controller intends to initiate the initialization sequence for the addressed flash buffer circuit, such as flash buffer circuit 107. The Start Initialization routine causes the flash-specific DMA controller to program a Start Group Number into internal registers of flash buffer circuit 107. The data on the n-bit data path during the write command following the request command will then contain the Start Group number for flash buffer circuit 107.

As noted previously, the start group number and the end group number assigned to the flash buffer circuit indicate a range of group numbers that correspond to a set of flash memory devices coupled to this flash buffer circuit. This range of group numbers is utilized during the SELDEV state to select the appropriate flash buffer circuit that will be used to access a specific flash memory device within this range of group numbers for a read or write memory operation.

During time period 1004, the flash-specific DMA controller sends the request command and the write command for the end initialization phase of the flash buffer circuit's initialization transfer mode. The data presented on the n-bit data path of intermediate bus 105 during the request command is a flash buffer command to end initialization, which collectively inform the flash buffer circuit that the flash-specific DMA controller will be assigning the End Group number. The data on the n-bit data path during the write command following the request command will then contain the End Group number of flash buffer circuit 107.

In the same way, flash-specific DMA controller 103 will initialize flash buffer circuits 108 to 110. The intermediate bus 105 will consequently go through SETSTART and SETEND states to establish the Start Flash Group number and End Flash Group number of flash buffer circuits 108 to 110.

Normal Transfer Mode (Write Transfers)

Figure 11A:
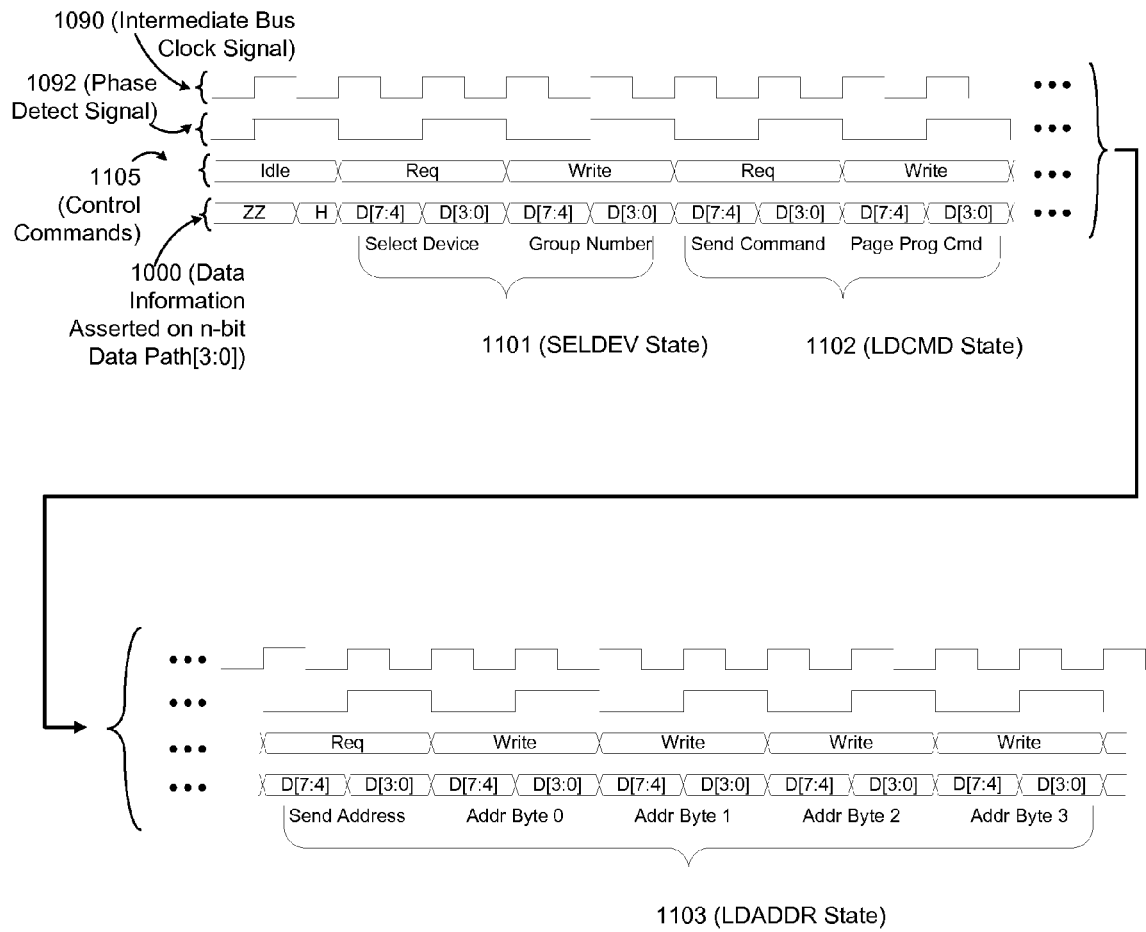
FIGS. 11A and 11B show timing diagrams during normal transfer modes (write operation) using a nibble-wide n-bit data path of an intermediate bus in accordance with yet another embodiment of the present invention.

FIG. 11A with reference to elements in FIG. 1, illustrates a timing diagram that may occur during the normal transfer mode involving write-based data transfers from an external host to the storage system in accordance with yet another embodiment of the present invention. FIG. 11 includes an intermediate bus clock signal 1090 for a nibble-wide intermediate bus, such as intermediate bus 105; a phase detect signal 1092; encoded commands, such as two-bit encoded command signals 1105; and data information 1000 asserted on an n-bit data path of intermediate bus 105. The elements referenced with respect to FIG. 1 include flash-specific DMA controller 103, intermediate bus 105, flash buffer circuit 110, flash memory bus 83, and flash bank 114 using write-through data transfer with single data sampling.

A write memory transaction request received from an external host 100 via host interface 98 will cause the local processor 101 to issue a high-level write request to flash-specific DMA controller 103. Flash-specific DMA controller 103 will translate the high-level request to a series of command, address and data sequences on multilevel memory bus system 90.

The flash-specific DMA controller 103 will initially send a request command to select a flash buffer circuit, such as flash buffer circuit 110. The intermediate bus-will enter the SELDEV state 1101 wherein the group number of the flash memory device in flash bank 114 is specified along with the selected flash buffer circuit. The intermediate bus 105 is now locked on to flash buffer circuit 110. All data information 1000, such as command, data and address bytes, transmitted by flash-specific DMA controller 103 over the n-bit data path of intermediate bus 105 from hereon is intended for flash buffer circuit 110. Flash buffer circuit 110, on the other hand, will assert the chip enable for the selected flash memory device.

Once intermediate bus 105 is locked on flash buffer circuit 110, the flash-specific DMA controller 103 will issue via the control path of the intermediate bus a control command, named "request control command", requesting a command byte to be sent to flash buffer circuit 110 via the n-bit data path of the intermediate bus. This command byte specifies the type of transaction that will be executed by the selected flash memory device in flash bank 114. The request made by flash-specific DMA controller 103 to transmit a command byte will cause the intermediate bus to enter the LDCMD state 1102. During the LDCMD state 1102, the flash-specific DMA controller transmits to flash buffer circuit 110 a memory device command, such as an ONFI NAND flash command page program command, by asserting the memory device command signals on the n-bit data path of the intermediate bus 105. A command byte, such as the ONFI NAND flash command page program command, is disposed to have a byte width but is sent in nibble portions since the n-bit data path of the intermediate bus is only a nibble wide in the embodiment shown in FIG. 1.

The LDCMD state 1102 leads the intermediate bus 105 to the LDADDR state 1103 where flash-specific DMA controller 103 transmits another control command through the control path, requesting to send memory address information to flash buffer circuit 110 on the n-bit data path of intermediate bus 105. This memory address specifies the flash memory address on which the memory device command will be executed. Flash buffer circuit 110 will transfer the address bytes from the intermediate bus 105 to flash memory bus 83, sending it to the flash memory device in flash bank 114 associated with the memory address.

Figure 11B:
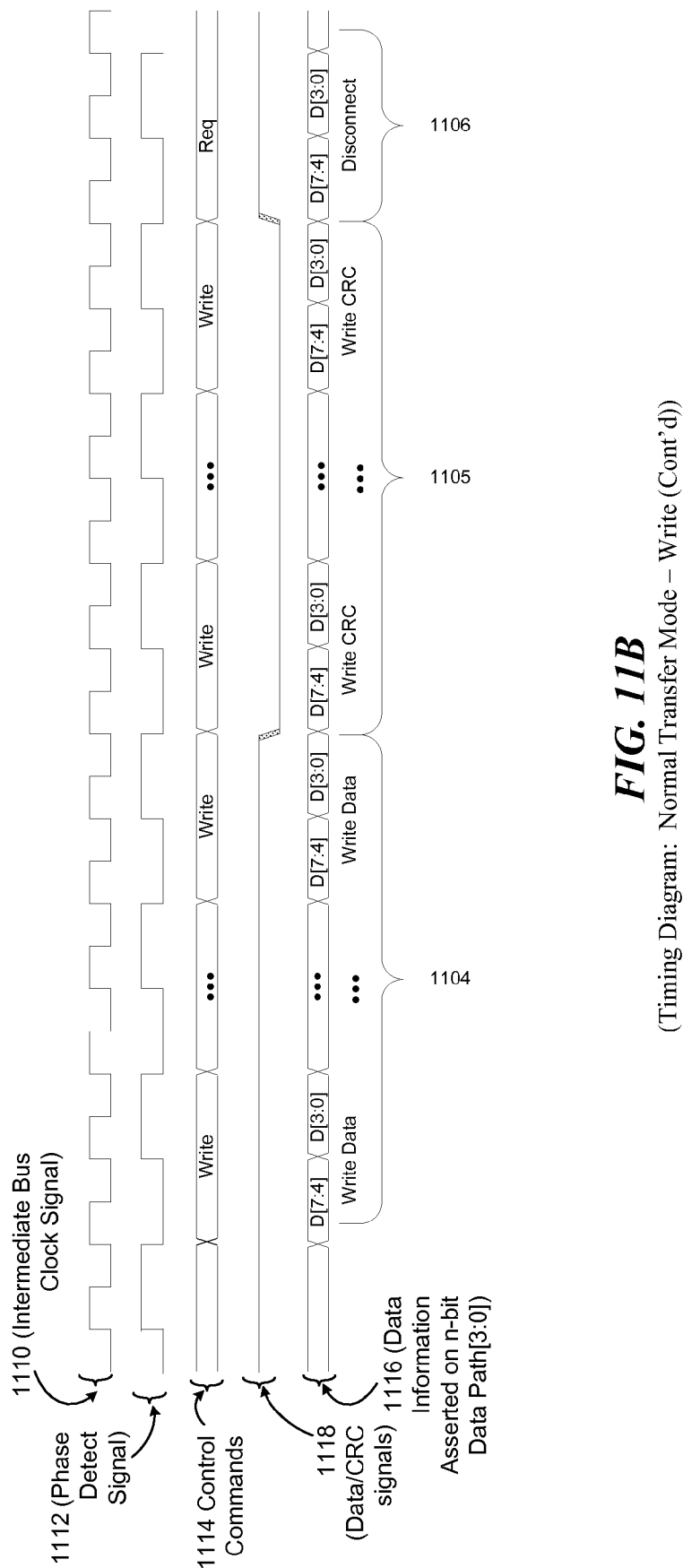

The data transfer phase to the flash buffer circuit 110 will commence once the flash-specific DMA controller 103 detects an acknowledge signal from the flash buffer circuit 110 as illustrated in FIG. 11B. FIG. 11B is discussed below with reference to elements in FIG. 1. FIG. 11B includes the following signals: intermediate bus clock signal 1110 for intermediate bus 105; phase detect signal 1112; control command signals 1114; data information 1116 asserted on an n-bit data path of intermediate bus 105; and a Data/CRC signal 1118 that is asserted on the Data/CRC signal line of intermediate bus 105.

The flash-specific DMA controller 103 will assert Data/CRC signal 1118 high on the Data/CRC signal line of intermediate bus 105, causing intermediate bus 105 to enter the WRDATA state 1104.

In WRDATA state 1104, and with reference also to the timing diagram previously disclosed in FIGS. 4A and 4C, flash-specific DMA controller 103 has control of the strobe signal line, and it toggles this strobe signal line of intermediate bus 105 to strobe data information, such as raw data or CRC data, to the flash buffer circuit 110. In the single data sampling embodiment of FIG. 4C, flash buffer circuit 110 samples data on every positive edge of the strobe signal 412. If the positive edge of the strobe signal 412 coincides with the Phase Detect asserted low during time period 403, flash buffer circuit 110 will treat that data on the n-bit data path as the upper nibble of the data information asserted on the n-bit data path. Otherwise, if the positive edge of the strobe signal 412 coincides with the phase detect signal at time period 404, data information on the n-bit data path is stored as the lower nibble of the one byte information. Several write data cycles will be executed until one page worth of data is transferred from the flash-specific DMA controller 103 to the flash buffer circuit 110. Although single data sampling is used in the above example for the WRDATA state 1104, other types of data sampling may be used, such as double data sampling.

If the flash buffer circuit 110 detects that raw data in its internal data buffer 205 has reached previously set threshold, flash buffer circuit 110 will initiate data transfer to the flash memory device in flash bank 114.

As soon as the flash-specific DMA controller 103 transfers the last byte of data, it will assert the Data/CRC signal 1118 low. With the assertion of the Data/CRC signal 1118 to a logic low, intermediate bus 105 transitions to WRCRC state 1105 where CRC data is transferred to flash buffer circuit 110. In the example shown in FIG. 11B, four (4) bytes of CRC data is transferred to flash buffer circuit 110. Flash buffer circuit 110 will not transfer these CRC bytes to the flash memory device in flash bank 114. CRC information is used by the flash buffer circuit 110 to verify that no error was encountered on the concluded data transfer.

With the receipt of the last CRC byte, the intermediate bus enters into the DISC state 1106, causing flash-specific DMA controller 103 to disconnect from flash buffer circuit 110. Meanwhile, raw data from the internal data buffer 205 of flash buffer circuit 110 is still being transferred to the flash memory device in flash bank 114. In this fashion, although the programming of data in the flash memory device itself is not yet completed, the intermediate bus is rendered available for use by flash-specific DMA controller 103 to set off another set of memory transactions.

Normal Transfer Mode (Read Transfers)

To illustrate data transfers from a storage system to an external host, the discussion provided below will employ the elements disclosed in FIG. 1, including, multilevel memory bus system 92, host interface 98, local processor 101, flash-specific DMA controller 104, intermediate bus 106 disposed with a nibble-wide n-bit data path, flash buffer circuit 115, flash memory bus 84, and flash bank 119 using store and forward transfer with double data sampling.

A request received from an external host 100 will cause local processor 101 to issue a high-level request to flash-specific DMA controller 104. Flash-specific DMA controller 104 will translate the high-level request to a series of command, address and data sequences on multilevel memory bus system 92.

Flash-specific DMA controller 104 will initially send a request control command to select flash buffer circuit 115.

Figure 12A:
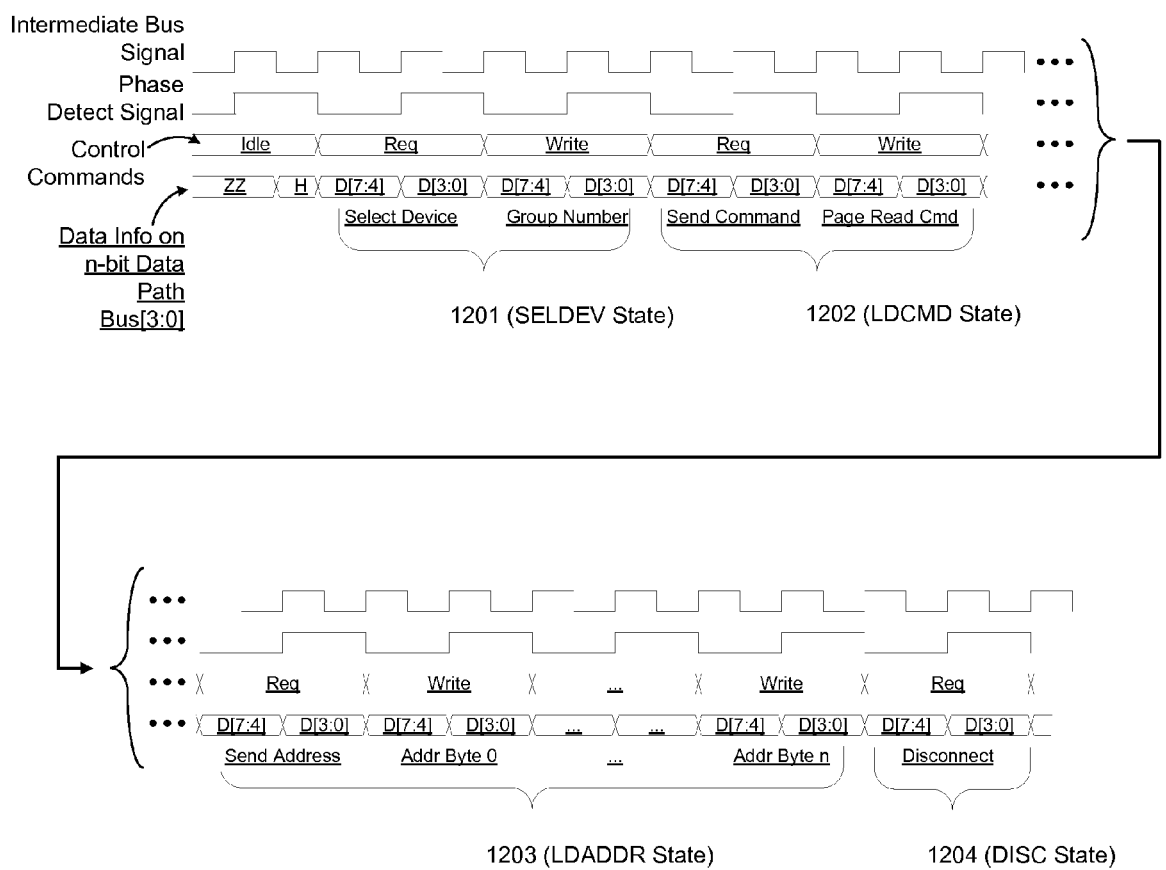
FIGS. 12A and 12B show timing diagrams during normal transfer modes (read operation) in a nibble-wide n-bit data path of an intermediate bus in accordance with a further embodiment of the present invention.
Figure 12B:
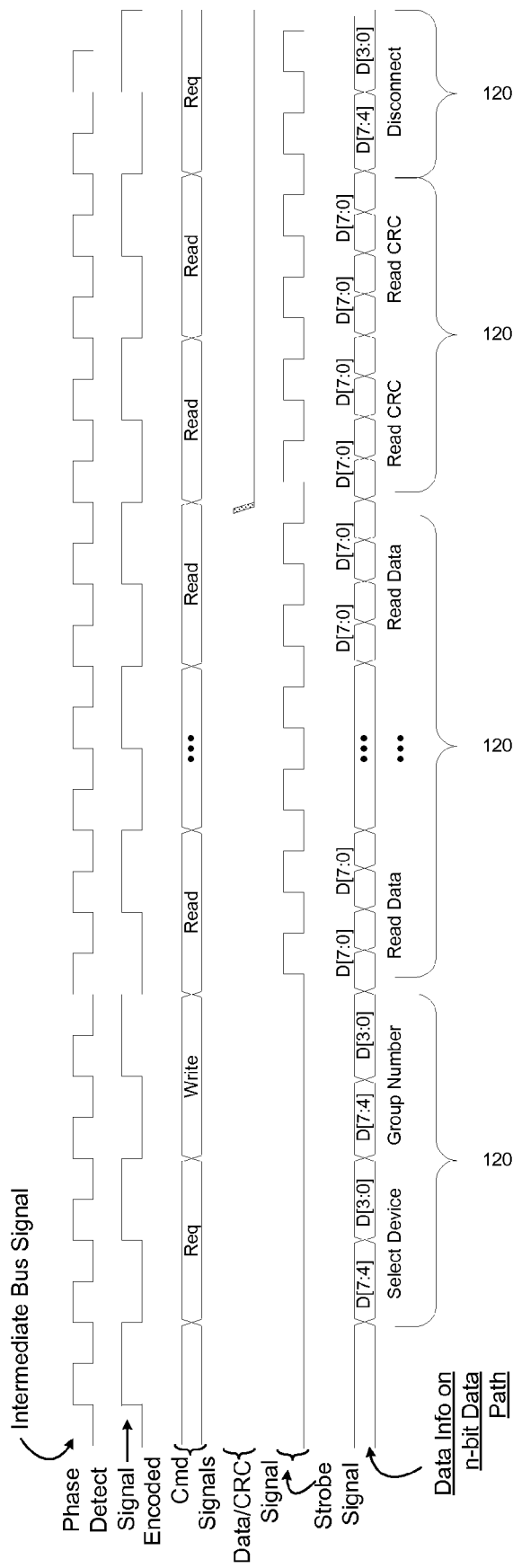

FIGS. 12A and 12B illustrate the timing diagrams that will occur during this normal transfer mode in accordance with yet another embodiment of the present invention. Intermediate bus 106 will enter SELDEV state 1201 which specifies the group number of the flash memory device in flash bank 119 and the selected flash buffer circuit 115. This locks intermediate bus 106 to flash buffer circuit 115. All data information, such as command, data and address bytes, transmitted by flash-specific DMA controller 104 over the n-bit data path of intermediate bus 106 from hereon is intended for flash buffer circuit 115. Flash buffer circuit 115, on the other hand, will assert the chip enable for the selected flash memory device.

Once the intermediate bus 106 is locked to flash buffer circuit 115, flash-specific DMA controller 104 will issue a request control command requesting a command byte to be sent that will specify the type of transaction that will be executed by the selected flash memory device in flash bank 119. The request made by the flash-specific DMA controller 104 to transmit a command byte will cause intermediate bus 106 to enter the LDCMD state 1202. During LDCMD state 1202, flash-specific DMA controller transmits command bytes, such as the ONFI NAND flash command Page Read command, to flash buffer circuit 115 via the n-bit data path of the intermediate bus 106. A command byte, such as the ONFI NAND flash command Page Read command, is disposed to have a byte width but is sent in nibble portions since the n-bit data path of the intermediate bus is only nibble wide in the embodiment shown in FIG. 1.

The LDCMD state 1202 leads intermediate bus 106 to the LDADDR state 1203, where flash-specific DMA controller 104 transmits more command information, including a memory address, on the n-bit width data path of intermediate bus 106. This memory address, which is in the form of address bytes, specifies the flash memory address where the read operation will be executed. Flash buffer circuit 115 will transfer the memory address from intermediate bus 106 to flash memory bus 84, sending it to a flash memory device in flash bank 119.

Once all address bytes are sent, the intermediate bus enters the DISC state 1204, causing flash-specific DMA controller 104 to disconnect from intermediate bus 106, which frees intermediate bus 106. The addressed flash memory device in flash bank 119 can then assert its corresponding dedicated busy line after DISC state 1204.

While intermediate bus 106 is free, flash-specific DMA controller 104 monitors the corresponding intermediate bus busy line to determine if the memory device command, such as the page read command, has been completed. In the embodiment shown in FIG. 12B, the completion of a page read command is achieved when all raw data has been read from the addressed flash memory device from flash bank 119.

After the flash buffer circuit 115 has fetched the raw data required under a memory device command, flash buffer circuit 115 de-asserts the shared busy line, such as shared busy line 807 in FIG. 8, previously asserted by flash buffer circuit 115 for this transaction.

Once flash-specific DMA controller 104 detects the de-assertion of the intermediate bus 106 busy line for the previously sent memory device command, such as the page read command, it will re-establish the intermediate bus connection by going into the SELDEV state 1205. As illustrated in FIG. 12B, the group number of the flash memory device in flash bank 119 is again specified along with the previously selected flash buffer circuit 115. A data transfer from the flash memory device in flash bank 119 to an internal data buffer, such as internal data buffer 205 in FIG. 2, of flash buffer circuit 115 will then commence. Once a pre-defined read threshold is met for the internal data buffer, flash buffer circuit 115 will initiate a data transfer from the internal data buffer of flash buffer circuit 115 to flash-specific DMA controller 104 during the RDDATA state 1206 by asserting the acknowledge line of flash buffer circuit 115.

During RDDATA state 1206, double data sampling will be implemented to strobe data information, which includes raw data and CRC data, from flash buffer circuit 115 to the flash-specific DMA controller 104. The timing diagram for double data sampling was previously disclosed above in FIG. 4D. Using double data sampling is not intended to limit the present invention in any way. As soon as flash buffer circuit 115 transfers the last byte of data information, it will assert the Data/CRC signal on the Data/CRC signal line to a logic low. With the de-assertion of the Data/CRC line, intermediate bus 106 transitions to RDCRC state 1207 where CRC data is transferred to flash-specific DMA controller 104. In FIG. 12B, the amount of CRC data transferred is four (4) bytes although this is not intended to be limiting in any way. This CRC data is used by flash-specific DMA controller 104 to verify that the raw data transferred during the data transfer phase was received without error.

We claim:

1. A multilevel memory bus system for a solid-state storage device that includes a plurality of semiconductor memory devices, a host interface, at least one flash-specific-DMA controller, and a local processing system that includes a local memory, the multilevel memory bus system comprising:

an intermediate bus disposed to couple to said at least one flash-specific DMA controller;

a first flash memory bus disposed to couple to at least one semiconductor memory device from the plurality of semiconductor memory devices, said at least one semiconductor memory device including a first semiconductor memory device;

a first flash buffer circuit coupled to said intermediate bus and to said first flash memory bus; and wherein said intermediate bus is disposed to transfer data at a first data path transfer rate, said first flash memory bus is disposed to transfer data at a second data path transfer rate, and said first and second data path transfer rates are different;

a first output that provides a first data path clock signal having a first clock frequency;

a second output that provides a second data path clock signal having a second clock frequency; and said first clock frequency is at least equal to said second clock frequency;

said intermediate bus includes a first data path having a first bus width;

said first flash buffer circuit includes a first intermediate bus interface having an interface data throughput that is proportional to said first bus width, said first clock frequency, and a selected sampling rate;

a strobe output disposed to provide a first strobe signal having a first strobe frequency;

wherein said selected sampling rate is at least same as that of said first strobe frequency;

wherein said intermediate bus interface has an interface data throughput that is defined by:

IBthru=DataWidth IB*FREQfactor*FREQ*DS where said IBthru is equal to said interface data throughput, said DataWidth IB is equal to said first bus width, said FREQfactor is equal to the quotient of said first frequency divided by said second clock frequency rounded to the nearest integer, said FREQ is equal to said first clock frequency, and said DS is equal to said selected integer multiple.

2. The multilevel memory bus system of claim 1, wherein said selected sampling rate is equal to a selected integer multiple of said first strobe frequency.

3. The multilevel memory bus system of claim 1, wherein said first strobe frequency signal further includes a plurality of rising edges;
and said first flash buffer circuit samples data on said intermediate bus each time a rising edge from said plurality of rising edges is provided by said strobe output.

4. The multilevel memory bus system of claim 1, wherein said first strobe signal further includes a plurality of falling;
and said first flash buffer circuit samples data on said intermediate bus each time a falling edge from said plurality of falling edges is provided by said strobe output.

5. The multilevel memory bus system of claim 4, wherein said at least one flash-specific DMA controller includes a first flash-specific DMA controller, said first flash-specific DMA controller disposed to strobe said data on said intermediate bus at a frequency equal to said first strobe frequency only during a data transfer phase.

6. The multilevel memory bus system of claim 1, wherein said first strobe signal further includes a plurality of rising edges and a plurality of falling edges;
and said first flash buffer circuit samples data on said intermediate bus each time an edge from said plurality of rising edges or said plurality of falling edges is provided by said strobe output.

7. The multilevel memory bus system of claim 1, wherein one edge from said plurality of falling edges and another edge from said plurality of rising edges occur with the same period of said first strobe frequency.

8. The multilevel memory bus system of claim 1, wherein:
said first memory bus further includes a first memory bus width;
said first flash buffer circuit further includes a first memory bus interface having a memory bus data throughput that is proportional to said first memory bus width and said second clock frequency.

9. The multilevel memory bus system of claim 8, wherein said intermediate bus interface data throughput is equivalent to said first data path transfer rate and said memory bus data throughput is equal to said second data path transfer rate.

10. The multilevel memory bus system of claim 1, wherein said flash memory bus interface has a flash memory bus interface data throughput that is defined by:
FMBUS : DataWidth_FMB* FREQ
where said FMBUS is equal to said flash memory bus interface data throughput, said DataWidth_FMB is equal to said second bus width, and said FREQ is equal to said second clock frequency.

11. The multilevel memory bus system of claim 1, wherein said flash buffer circuit includes an internal buffer for buffering data received from said flash-specific DMA controller or from said semiconductor memory device.

12. The multilevel memory bus system of claim 1, further including dedicated busy lines.

13. The multilevel memory bus system of claim 1, further including:
a second flash buffer circuit coupled to said intermediate bus;
an exclusive busy circuit disposed to monitor time multiplexed signals from said first and second flash buffer circuits.

14. The multilevel memory bus system of claim 1, further including an exclusive busy circuit disposed to monitor a busy signal generated by said first semiconductor memory device.

15. The multilevel memory bus system of claim 1, further including an exclusive busy circuit disposed to monitor a busy signal generated by said first semiconductor memory device and transmitted to said first flash buffer circuit.

16. A storage device, comprising:
a local processing system that includes a local memory, a local bus, at least one flash-specific DMA controller, including a first flash-specific DMA controller, and a host interface;
an intermediate bus coupled to said at least one flash-specific DMA controller;
a plurality of semiconductor memory devices, including a first semiconductor memory device;
a first flash memory bus coupled to said first semiconductor device;
a first flash buffer circuit coupled to said intermediate bus and to said first memory bus; and
an adaptability mechanism disposed to transfer data across said intermediate bus at a first data path transfer rate and across said first memory bus at a second data path transfer rate that is different from said first data path transfer rate;
said intermediate bus includes a first data path having a first bus width;
said first flash buffer circuit includes a first intermediate bus interface having an interface data throughput that is proportional to said first bus width, a first clock frequency, and a selected sampling rate;
a strobe output disposed to provide a first strobe signal having a first strobe frequency;
wherein said selected sampling rate is equal to a selected multiple of said first strobe frequency;
wherein said interface data throughput is defined by:
IBthru : DPWib*FREQfactor*FREQ* DS where said IBthru is equal to said interface data throughput, said DPWib is equal to said first bus width, said FREQfactor is equal to the quotient of said first frequency divided by said second clock frequency rounded to the nearest integer;
said FREQ is equal to said second clock frequency, and said DS is equal to said selected integer multiple.

17. The multilevel memory bus system of claim 16, wherein said intermediate bus interface and a memory bus interface are formed as part of said first flash buffer circuit.

18. The storage device of claim 16, wherein said adaptability mechanism includes an intermediate bus interface and a flash memory bus interface, said intermediate bus interface disposed to transfer data at an interface data throughput, said memory bus interface disposed to transfer data at a memory bus interface throughput, and said interface data throughput and said memory bus interface throughput are different.

19. The storage device of claim 18, wherein said interface data throughput is equivalent to said first data path transfer rate and said memory bus data throughput is equal to said second data path transfer rate.

20. The storage device of claim 16, wherein said flash buffer circuit includes an internal buffer for buffering data received from said flash-speclfic DMA controller or from said semiconductor memory device.

21. The storage device of claim 16, further including dedicated busy lines.

22. The storage device of claim 16, further including:
   a second flash buffer circuit coupled to said intermediate bus;
   an exclusive busy circuit disposed to monitor time multiplexed signals from said first and second flash buffer circuits.

23. The storage device of claim 16, further including an exclusive busy circuit disposed to monitor a busy signal generated by said first semiconductor memory device.

24. The storage device of claim 16, further including an exclusive busy circuit disposed to monitor a busy signal generated by said first semiconductor memory device and transmitted to said first flash buffer circuit.

25. The storage device of claim 16, further including:
   a first output that provides a first data path clock signal having a first clock frequency;
   a second output that provides a second data path clock signal having a second clock frequency; and
   said first clock frequency is at least equal to said second clock frequency.

26. The storage device of claim 16, wherein:
   said first memory bus further includes a first memory bus width;
   said first flash buffer circuit further includes a first memory bus interface having a memory bus data throughput that is proportional to said first memory bus width and said second clock frequency.

27. The storage device of claim 26, wherein said interface data throughput is equivalent to said first data path transfer rate and said memory bus data throughput is equal to said second data path transfer rate.

28. The multilevel memory bus system of claim 1, wherein the first flash memory bus is coupled to at least one semiconductor memory device arranged in a flash bank.

29. The storage device of claim 16, wherein the first flash memory bus is coupled to the first semiconductor device arranged in a flash bank.

\* \* \* \* \*